(12) United States Patent
Kitajima et al.

(10) Patent No.: US 7,183,728 B2
(45) Date of Patent: Feb. 27, 2007

(54) MOTOR DRIVE SYSTEM AND PROCESS

(75) Inventors: Yasuhiko Kitajima, Kanagawa (JP); Kantaro Yoshimoto, Yokohama (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 11/258,203

(22) Filed: Oct. 26, 2005

(65) Prior Publication Data
US 2006/0091833 A1    May 4, 2006

(30) Foreign Application Priority Data
Oct. 29, 2004  (JP)  ............................ 2004-316718
Dec. 7, 2004   (JP)  ............................ 2004-354155
Dec. 8, 2004   (JP)  ............................ 2004-355547

(51) Int. Cl.
   *H02P 1/54*   (2006.01)
   *H02P 27/04*  (2006.01)

(52) U.S. Cl. ............... 318/109; 318/106; 318/108; 320/118; 307/10.1; 307/46; 307/48

(58) Field of Classification Search ........ 318/106–109; 320/118; 307/10.1, 46–48
See application file for complete search history.

(56) References Cited

U.S. PATENT DOCUMENTS 6,384,489 B1 * 5/2002 Bluemel et al. .......... 307/10.1

| | | | |
|---|---|---|---|
| 2002/0038732 A1* | 4/2002 | Sugiura et al. | 180/65.2 |
| 2004/0135546 A1* | 7/2004 | Chertok et al. | 320/118 |
| 2005/0105514 A1* | 5/2005 | Usuba et al. | 370/356 |
| 2005/0111246 A1* | 5/2005 | Lai et al. | 363/157 |
| 2006/0006832 A1* | 1/2006 | Kitajima et al. | 318/800 |

FOREIGN PATENT DOCUMENTS

EP    1 195 287 A2   4/2002
JP    2002-118981 A  4/2002

OTHER PUBLICATIONS

U.S. Appl. No. 11/174,643, filed Jul. 6, 2005, Kitajima et al.

* cited by examiner

*Primary Examiner*—Paul Ip
(74) *Attorney, Agent, or Firm*—Foley & Lardner LLP

(57) ABSTRACT

A motor drive system includes a multi-output dc power source providing three or more output potentials, and a switching circuit including switching devices connected, respectively, with the output potentials of the multi-output power source. A controller determines a command apply voltage representing a desired voltage to be applied to the motor, and further determines a plurality of command share voltages corresponding to supply voltages of the multi-output dc power source, from the command apply voltage. The controller produces a pulsed voltage by driving the switching devices in accordance with the command share voltages.

36 Claims, 35 Drawing Sheets

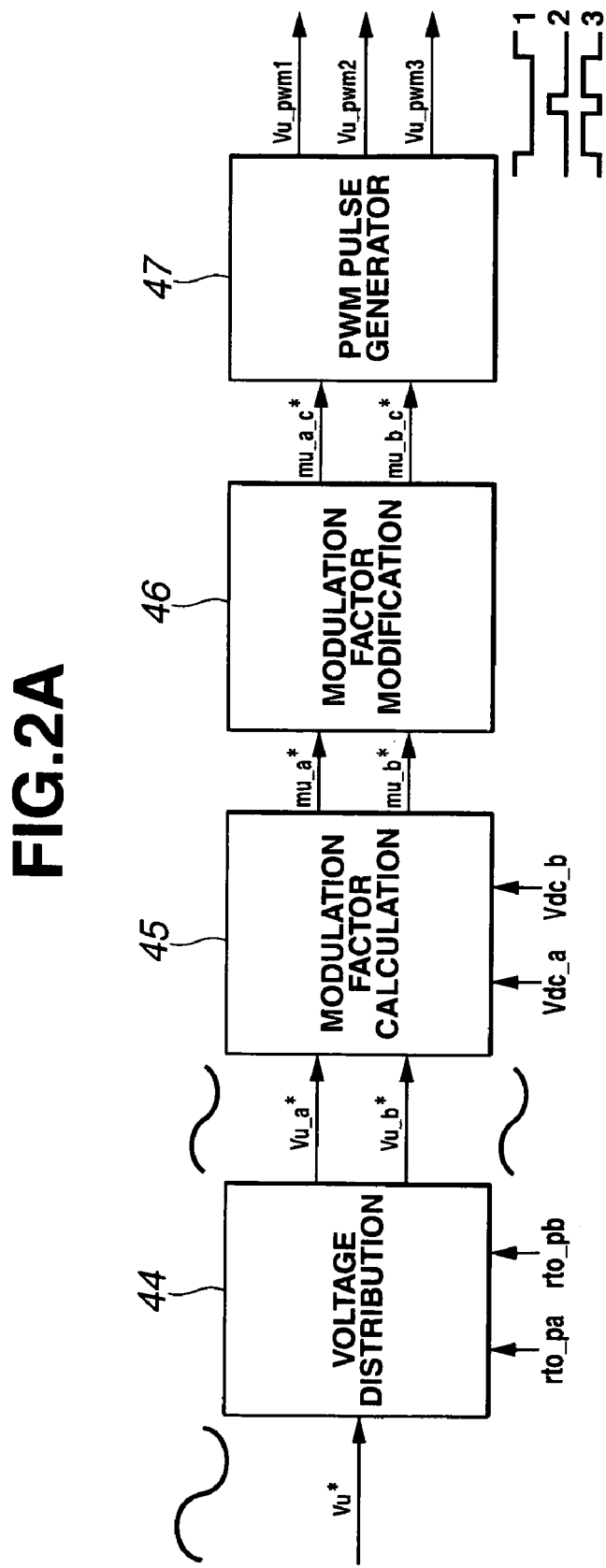

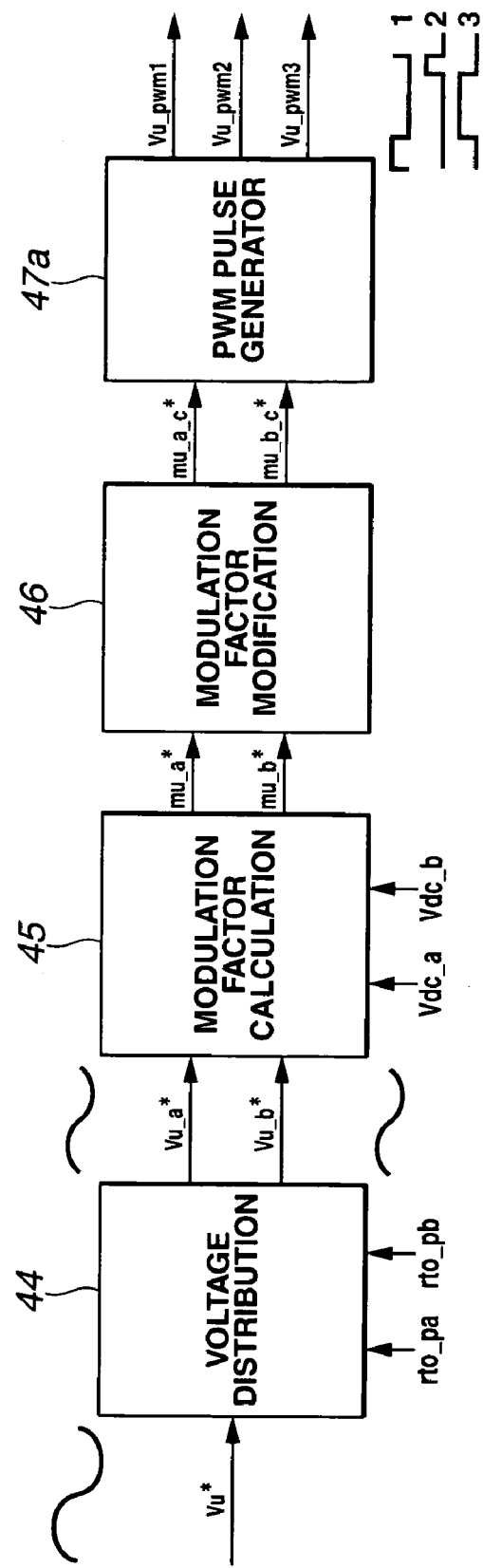

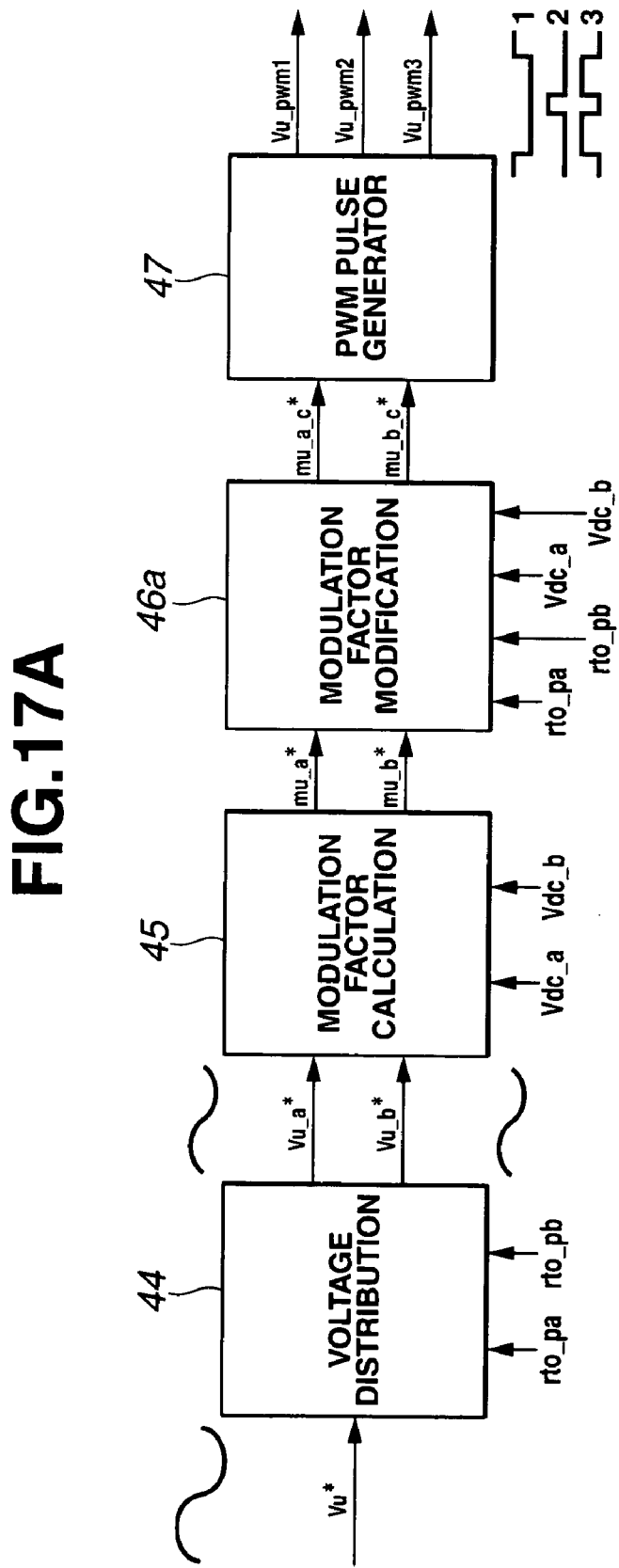

FIG.25
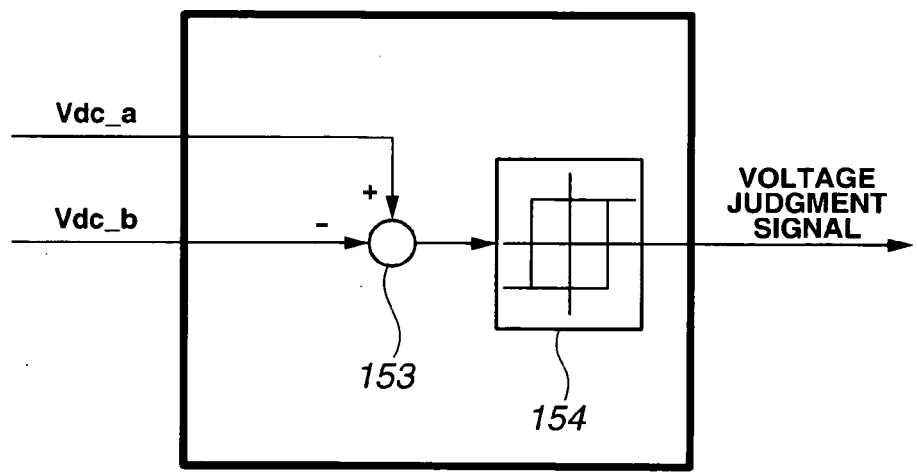
FIG.26
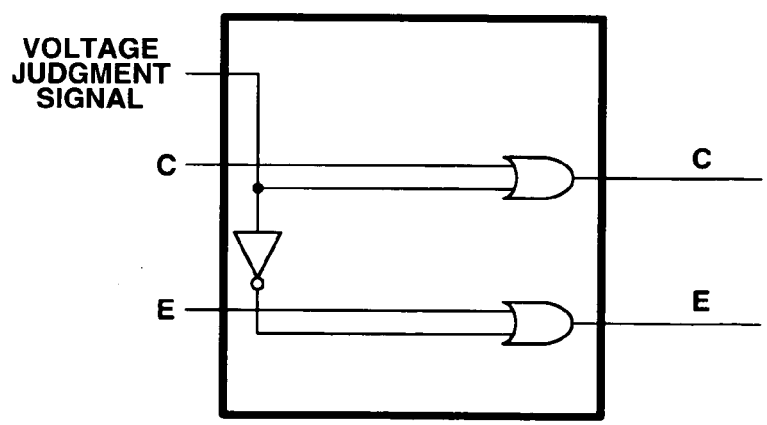
 : OR
 : NOT

MOTOR DRIVE SYSTEM AND PROCESS

BACKGROUND OF THE INVENTION

The present invention relates to apparatus and/or process for driving a motor, and apparatus and/or process for controlling a power converter for driving an ac motor.

US 2002/0038732A1 (→U.S. Pat. No. 6,920,948 B2) (corresponding to JP 2002-118981 A ([0004]~[0006], FIG. 1) and EP1195287A2) shows a vehicle equipped with a power supply system having a dc—dc converter for driving a motor with power from a fuel cell and a battery so as to improve the efficiency.

SUMMARY OF THE INVENTION

However, the use of a dc—dc converter tends to increase the size of the system, the manufacturing cost, and loss.

It is an object of the present invention to provide apparatus and/or process suitable for reducing the system size, cost and loss, and for controlling power of a multi-output power source more efficiently and freely.

According to one aspect of the present invention, a motor drive system for driving a motor, comprises: a multi-output dc power source providing three or more output potentials; a switching circuit including switching devices connected, respectively, with the output potentials of the multi-output power source, and arranged to drive the motor with power of the power source; and a controller configured to determine a command apply voltage representing a desired voltage to be applied to the motor, to determine a plurality of command share voltages corresponding to supply voltages of the multi-output dc power source, from the command apply voltage, and to produce a pulsed voltage by driving the switching devices in accordance with the command share voltages.

According to another aspect of the invention, a motor drive process for driving a motor with power of a multi-output dc power source providing three or more output potentials, the motor drive process comprises: a first process element of calculating a command apply voltage representing a desired voltage to be applied to the motor; a second process element of calculating a plurality of command share voltages corresponding to at least two of the output potentials of the multi-output dc power source, from the command apply voltage; and a third process element of producing a pulsed voltage to drive the motor by connecting one of the output potentials to the motor in accordance with the command share voltages.

According to still another aspect of the present invention, a motor drive system comprises: a multi-output dc power source including first, second and source terminals providing three output potentials; a switching circuit including first, second and third switching devices which are connected, respectively, with the first, second and third source terminals, and which are driven, respectively, by first, second and third PWM pulse signals to connect one of the source terminals with an ac motor to drive the motor with power of the multi-output dc power source; and a controller configured to produce the first PWM pulse signal by comparing a first desired modulation factor with a first periodic carrier signal, to produce the second PWM pulse signal by comparing a second desired modulation factor with a second periodic carrier signal, and to control a ratio between an amount of power supplied from the first source terminal and an amount of power supplied from the second source terminal, by varying the first desired modulation factor and the second desired modulation factor.

BRIEF DESCRIPTION OF THE DRAWINGS

FIG. 2A is a functional block diagram showing a main part of the control unit according to the first embodiment.

FIG. 2B is a functional block diagram showing a main part of a control unit according to a second embodiment of the present invention.

FIG. 17A is a functional block diagram showing a main part of the control unit according to a fourth embodiment.

FIG. 25 is a view showing a voltage comparator shown in FIG. 24.

FIG. 26 is a view showing a short circuit preventing path selector shown in FIG. 24.

DETAILED DESCRIPTION OF THE INVENTION

1st Embodiment

Figure 1:
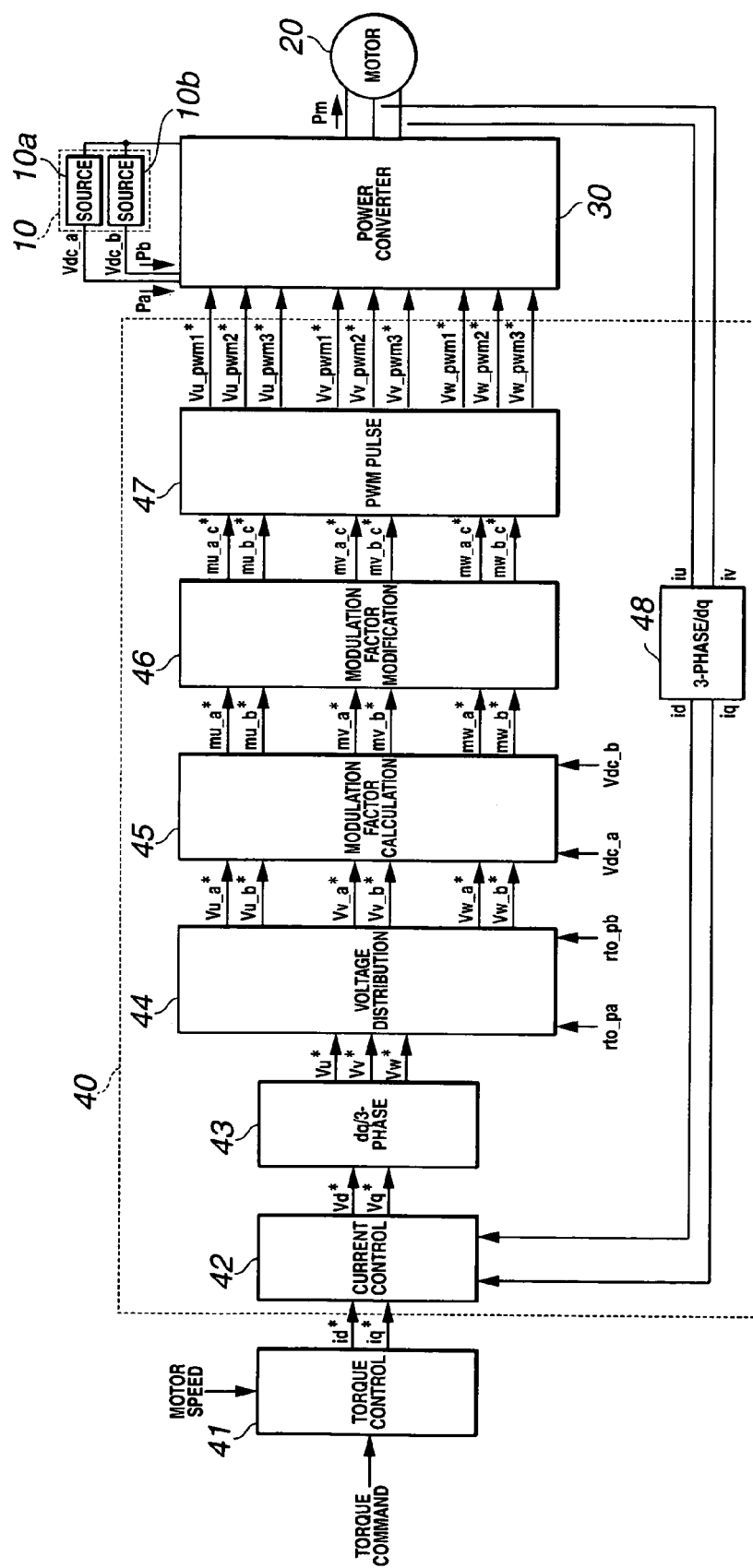
FIG. 1 is a functional block diagram showing a control unit of a motor drive system according to a first embodiment of the present invention.

FIG. 1 shows, in the form of a functional block diagram, a motor drive system according to a first embodiment of the present invention. The motor drive system is a control system for controlling a motor. The motor drive system of FIG. 1 includes a multi-output dc power source 10 including a first dc power source (first dc voltage supplying section) 10a and a second dc power source (second dc voltage supplying section) 10b; a motor 20; a power converter 30 for producing a voltage to be applied to motor 20 by using voltages of this multi-output power source 10; and a control unit (or controller) 40 for controlling a torque of motor 20 by driving power converter 30, and controlling a power distribution ratio between first and second power sources 10a and 10b.

Figure 3:
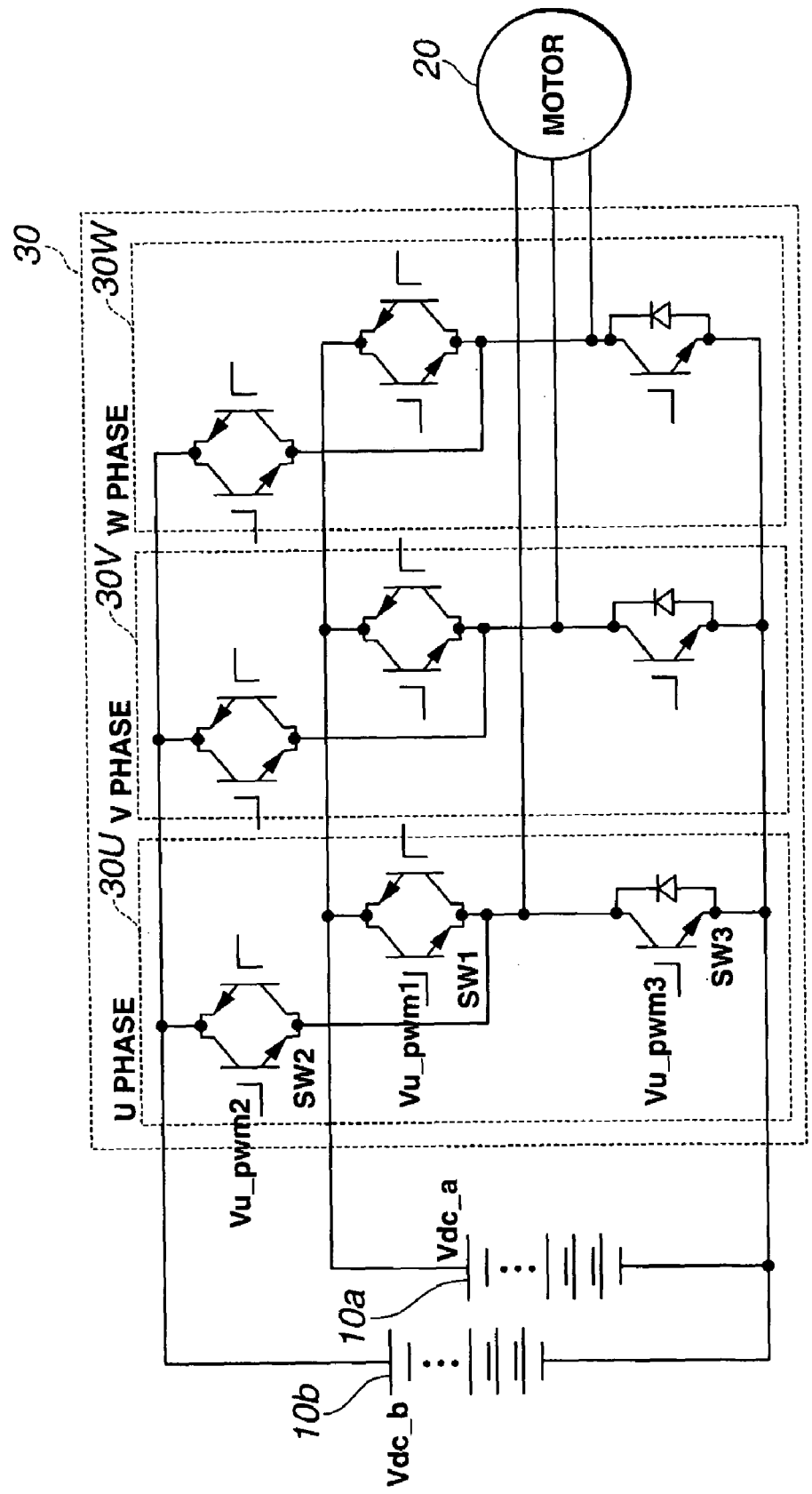
FIG. 3 is a circuit diagram showing a power converter employed in the first and second embodiments.

In multi-output power source 10, the lower potential terminals (or electrodes) of first and second dc power sources 10a and 10b are connected together to a common terminal providing a common potential (GND potential). A potential Vdc_a of first dc power source 10a is outputted through a first supply terminal, and a potential Vdc_b of second dc power source 10b is outputted through a second supply terminal. This power source 10 is a multi-output power source outputting three different potentials, GND, Vdc_a and Vdc_b. Motor 20 of this example is a three-phase ac motor driven by ac voltages produced by power converter 30. Power converter 30 is a dc-ac power converter producing motor driving voltages from the three potentials provided by multi-output dc power source 10. Power converter 30 includes a U phase switching circuit section 30U, a V phase switching circuit section 30V and a W phase switching circuit section 30W which are identical in construction to one another, as shown in FIG. 3. The U phase switching section 30U, by way of example, is a switch arrangement for producing a voltage applied to the U phase of motor 20, and includes first, second and third switches. U phase switching section 30U can supply a voltage to motor 420 by selecting one among the three potentials GND, Vdc_a and Vdc_b and connecting the selected one to motor 20 in such a control manner that the on times of the three potentials are varied so as to control the proportions of the on times, and thereby to provide a voltage required by motor 20. V phase switching circuit section 30V and W phase switching circuit section 30W are constructed and operated in the same manner.

Control unit 40 shown in FIG. 1 includes a current control section or circuit 42, a dq/3 phase transforming section or circuit 43, a voltage distribution section 44. A torque control section or circuit 41 shown in FIG. 1 receives a torque command supplied from the outside, and a motor speed; and calculates a d-axis command current id* and a q-axis command current iq*. Current control section 42 receives the d-axis and q-axis command currents id* and iq*, and d-axis and q-axis (actual) currents id and iq; and determines command voltages Vd* and Vq* to control id to id*, and control iq to iq*. The current id and iq are determined by a 3-phase/dq transforming section 48 from three-phase currents iu and iv. The dq/3-phase transforming section 43 transforms d-axis and q-axis command voltages Vd* and Vq* into three-phase command voltages Vu*, Vv* and Vw*. Voltage distribution section 44 receives three-phase command voltages Vu*, Vv* and Vw* from section 43, and a target power supply distribution command (rto_pa, rto_pb). From these voltages Vu*, Vv* and Vw*, the voltage distribution section 44 determines first and second source U-phase command share voltages Vu_a* and Vu_b* to be produced, respectively, from the potentials Vdc_a and Vdc_b; first and second source share V-phase command voltages Vv_a* and Vv_b* to be produced, respectively, from the potentials Vdc_a and Vdc_b; and first and second source W-phase command share voltages Vw_a* and Vw_b* to be produced, respectively, from the potentials Vdc_a and Vdc_b; in accordance with the target power supply distribution command (rto_pa, rto_pb) representing a desired amount of power Pa supplied from the first power source 10a and a desired amount of power Pb supplied from the second power source 10b.

Control unit 40 shown in FIG. 1 further includes a modulation factor calculation section or circuit 45, a modulation factor modifying section or circuit 46, a PWM pulse generating section or circuit 47. Modulation factor calculating section 45 receives potential Vdc_a of first power source 10a and potential Vdc_b of second power source 10b, and determines instantaneous command modulation factors mu_a*, mu_b*, mv_a*, mv_b*, mw_a* and mw_b* which are normalized command share voltages obtained by normalizing Vu_a*, Vu_b*, Vv_a*, Vv_b*, Vw_a* and Vw_b*. Modulation factor modifying section 46 produces final modified command modulation factors mu_a_c*, mu_b_c*, mv_a_c*, mv_b_c*, mw_a_c* and mw_b_c* by performing operation prior to PWM on the instantaneous command modulation factors. In accordance with these modified command modulation factors, the PWM pulse generating section 47 produces PWM pulses for turning on and off the switches in power converter 30.

The thus-constructed motor drive system is operated as follows: By using the power converter 30 having a simple construction as shown in FIG. 3, the motor drive system shown in FIG. 1 can freely control the amount (or proportion) of power supply from first dc power source 10a and the amount (or proportion) of power supply from second dc power source 10b in response to a desired distribution command, while controlling the torque of motor 20. Sections 44, 45 and 46 shown in FIG. 1 function to control the distribution or apportionment of power between a plurality of power sources to desired values. Voltage distribution section 44 performs calculating operations based on the following principle. The following two conditions are to be satisfied in order to control the motor torque as commanded and to vary the proportion (or percentage) of power Pa supplied from first source 10a and the proportion (or percentage) of power Pb supplied form second source 10b.

1) Voltage condition $$Vu^* = Vu\_a^* + Vu\_b^*$$

$$Vv^* = Vv\_a^* + Vv\_b^*$$

$$Vw^* = Vw\_a^* + Vw\_b^*$$

2) Power condition $$Pa: Pb = Vu\_a^* : Vu\_b^*$$

$$Pa: Pb = Vv\_a^* : Vv\_b^*$$

$$Pa: Pb = Vw\_a^* : Vw\_b^*$$

Figure 7:
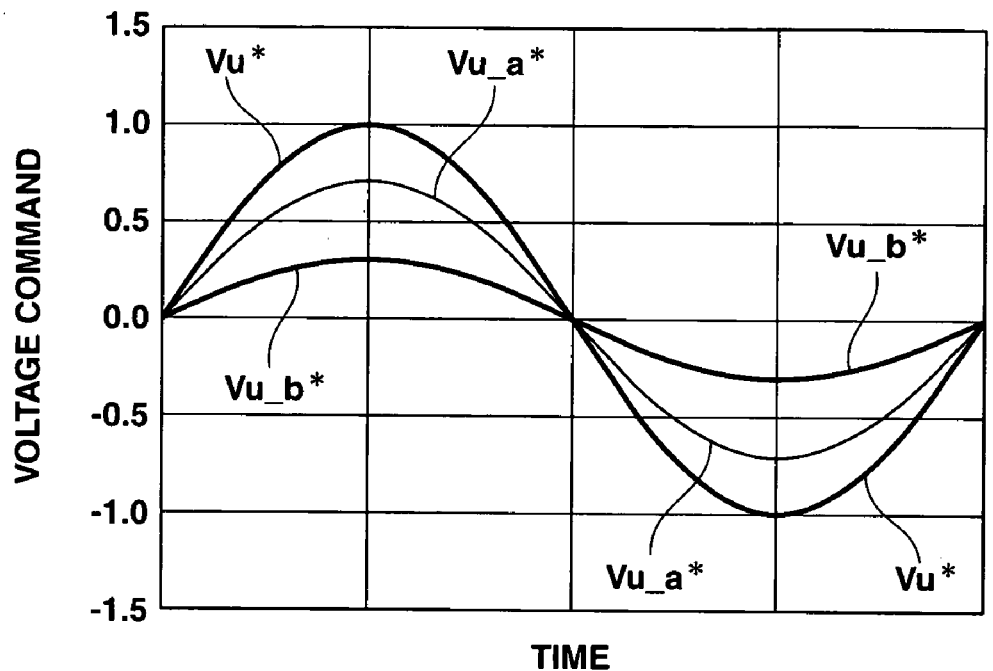
FIG. 7 is a graph for illustrating power distribution in the system of FIG. 1 in the form of phase voltage waveforms when the powers from the two sources are the same in the positive/negative sign.
Figure 9:
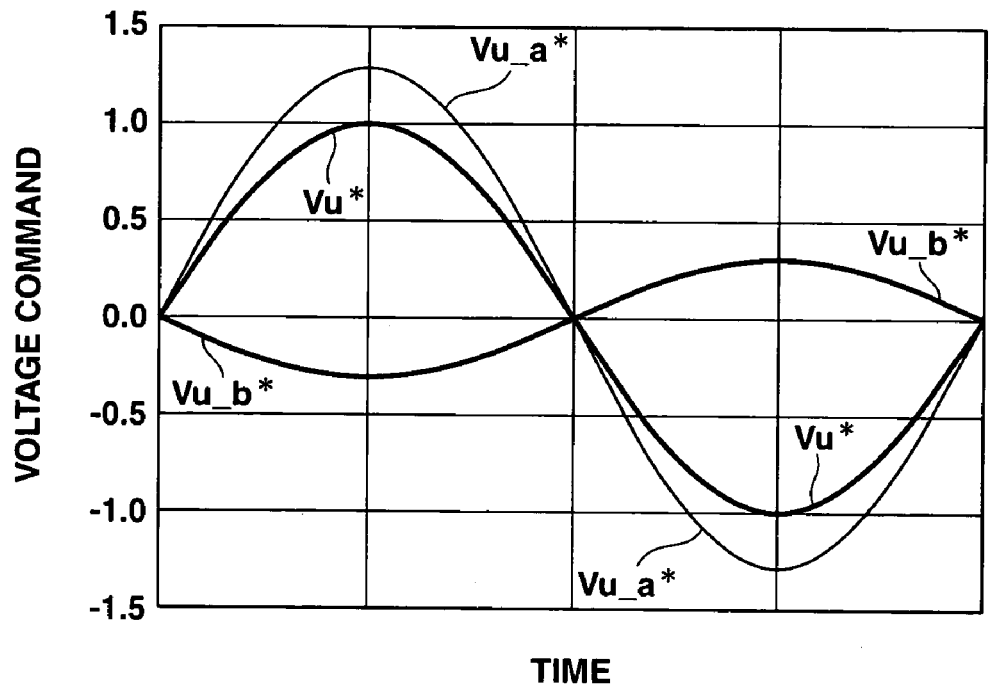
FIG. 9 is a graph for illustrating power distribution in the system of FIG. 1 in the form of phase voltage waveforms when the powers from the two sources are opposite in the positive/negative sign.
Figure 10:
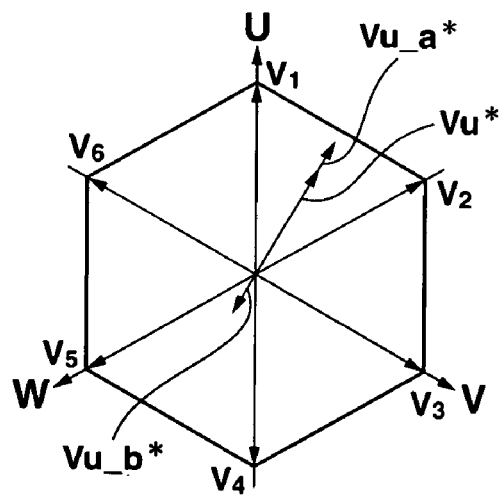
FIG. 10 is a view for illustrating power distribution in the system of FIG. 1 in the form of voltage vectors when the powers from the two sources are opposite in the positive/negative sign.

FIGS. 7 and 9 show the U phase command voltage Vu*, and first and second source command share voltages Vu_a* and Vu_b* for first and second sources 10a and 10b. Pa and Pb are identical in the (positive/negative) sign in the case of FIG. 7, and opposite in the sign in the case of FIG. 9. The above-mentioned two conditions can be expressed in the form of voltage vectors.

1) Voltage condition $$V^* = Va^*(Vu\_a^*, Vv\_a^*, Vw\_a^*) + Vb^*(Vu\_b^*, Vv\_b^*, Vw\_b^*)$$

2) Power condition $$Pa: Pb = sgn(Va^*)|Va^*(Vu\_a^*, Vv\_a^*, Vw\_a^*)|:sgn(Vb^*)|Vb^*(Vu\_b^*, Vv\_b^*, Vw\_b^*)|$$

Figure 8:
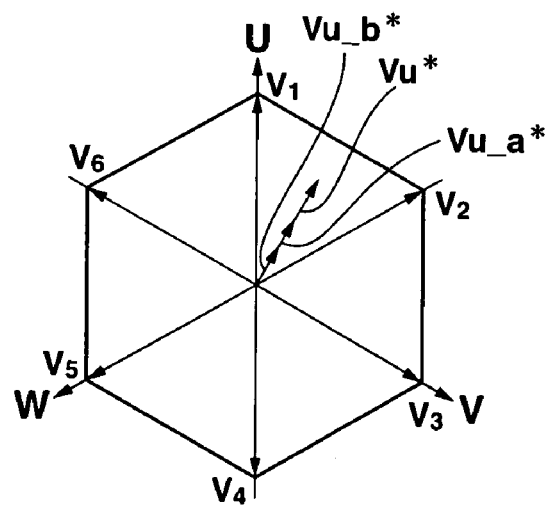
FIG. 8 is a view for illustrating power distribution in the system of FIG. 1 in the form of voltage vectors when the powers from two sources are the same in the positive/negative sign.

In the power condition, each of sgn(Va*) and sgn(Vb*) is equal to 1 in the same direction as the voltage vector V, and equal to −1 in the opposite direction to the voltage vector V. FIGS. 8 and 9 show these voltage vetors.

The sum P of powers supplied from the two power sources is expressed as: P=Pa+Pb. In this example, Pa=rto_pa·P and Pb=rto_pb·P. In these equations, rto_pa=Pa/P, and rto_pb=Pb/P. Voltage distribution section 44 receives, as inputs, command voltages Vu*, Vv* and Vw* and the voltage distribution command representing the ratio rto_pa (=1−rto_pb); and calculates the first and second source command share voltages from these inputs according to the following equations.

$$Vu\_a^* = rto\_pa \cdot Vu^*$$

$$Vu\_b^* = rto\_pb \cdot Vu^*$$

$$Vv\_a^* = rto\_pa \cdot Vv^*$$

$$Vv\_b^* = rto\_pb \cdot Vv^*$$

$$Vw\_a^* = rto\_pa \cdot Vw^*$$

$$Vw\_b^* = rto\_pb \cdot Vw^*$$

Figure 4:
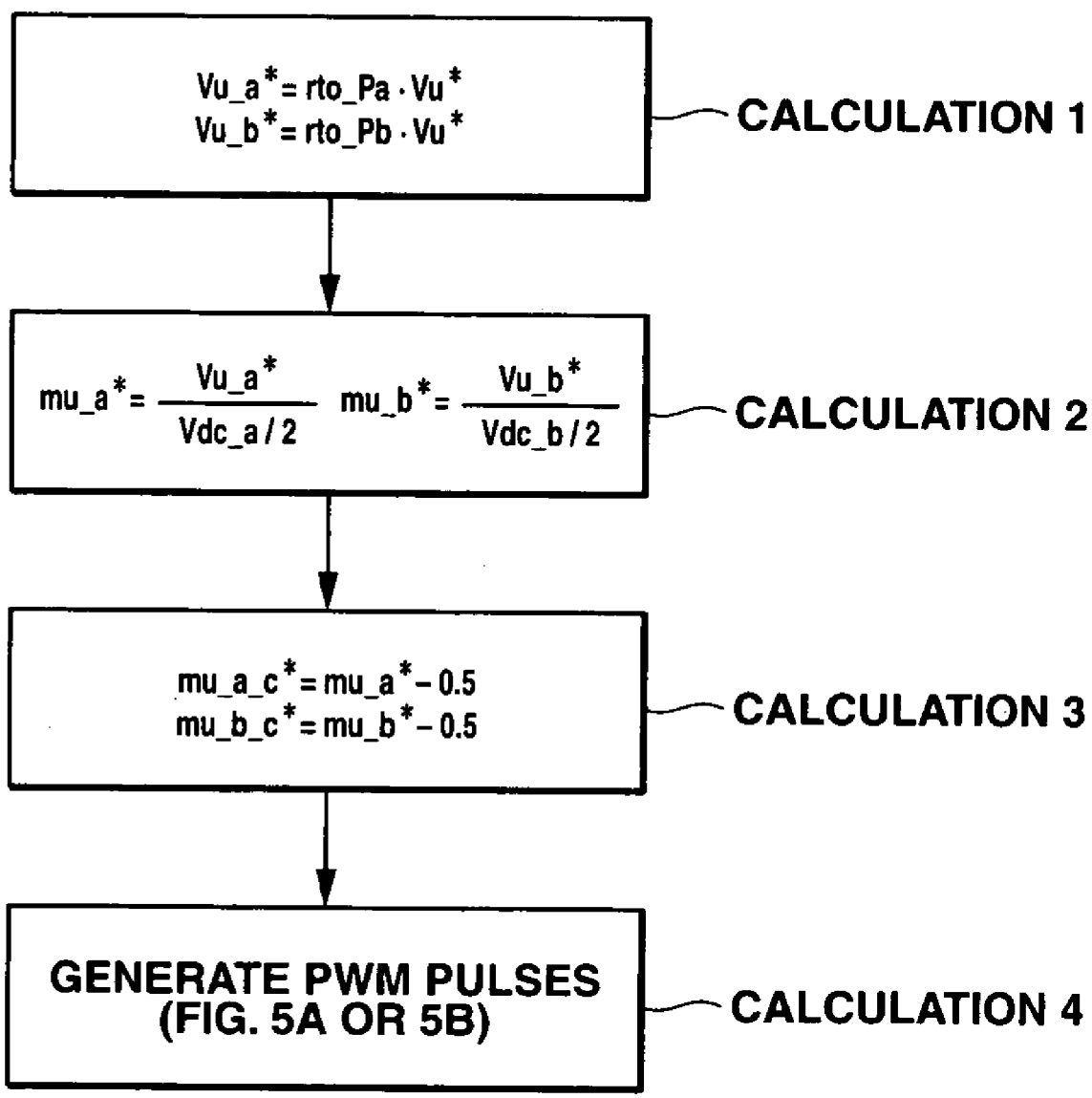
FIG. 4 is a flowchart showing a control process performed by the control unit according to one of the first and second embodiments, and composed of steps corresponding to blocks shown in FIG. 2A or 2B.
Figure 5A:
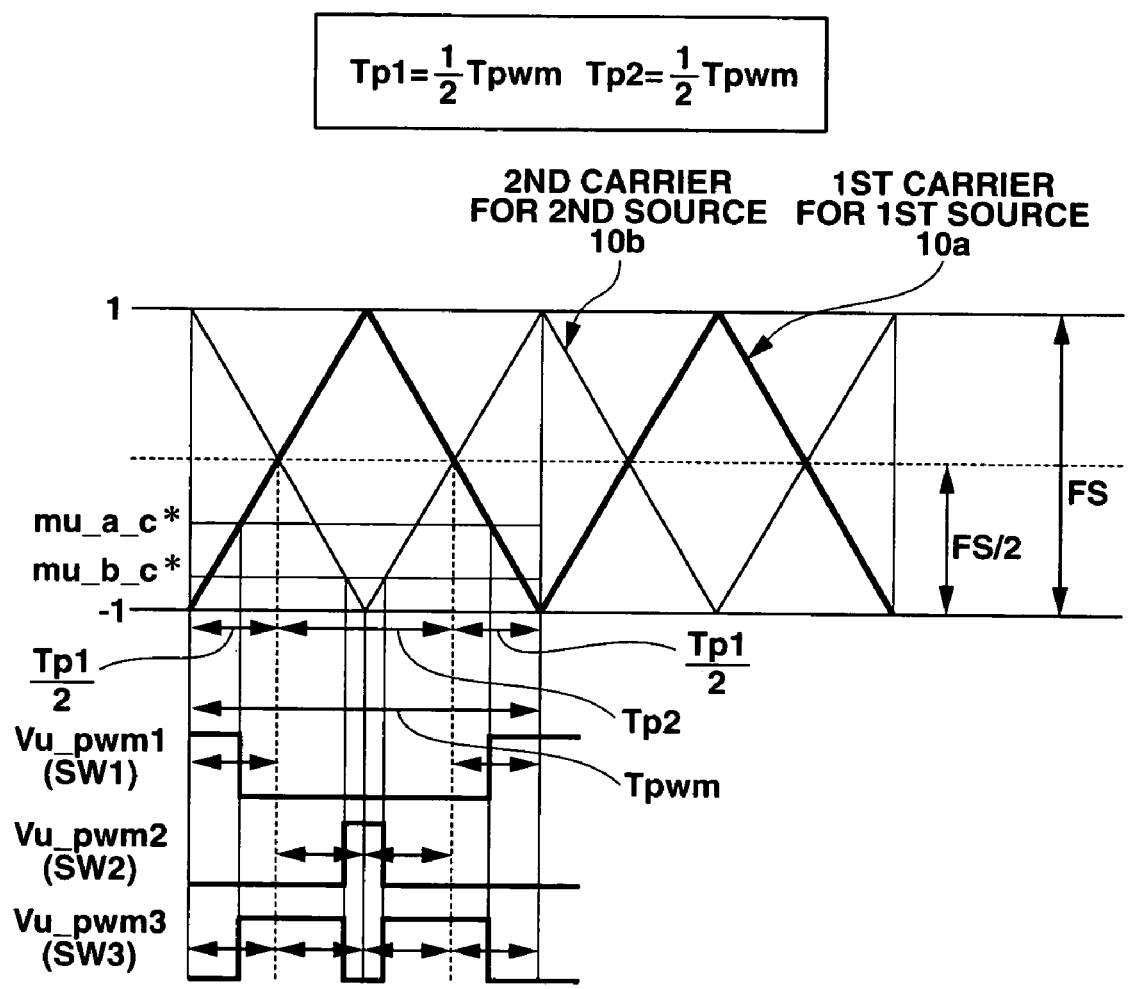
FIG. 5A is a timing chart showing a PWM pulse generating method according to the first embodiment shown in FIG. 2A.

FIGS. 2A, 4 and 5A illustrate the modulation factor calculation section 45, modulation factor modifying section 46 and PWM pulse generating section 47 more in detail. FIG. 2A is a functional block diagram showing part of control unit 40, including the sections 44~47. FIG. 4 illustrates operations of the sections 44~47 in the form of a flowchart. FIG. 5A is a timing chart for illustrating the PWM pulse generating method in the first embodiment. The following explanation is directed only to the U phase. Explanation about the V and W phases is omitted because the operations in the V and W phases are substantially identical to those in the U phase.

Modulation factor calculating section 45 performs calculation 2 shown in FIG. 4 by using the following equations.

$$mu\_a^* = Vu\_a^*/(Vdc\_a/2)$$

$$mu\_b^* = Vu\_b^*/(Vdc\_b/2)$$

In this way, the instantaneous command modulation factor mu_a* for first power source 10a and the instantaneous command modulation factor mu_b* for second power source 10b are determined by normalizing the first and second source U-phase share command voltages Vu_a* and Vu_b* with the halves of respective dc voltages.

Modulation factor modifying section 46 performs calculation 3 shown in FIG. 4 by using the following equations.

$$mu\_a\_c^* = mu\_a^* - 0.5$$

$$mu\_b\_c^* = mu\_b^* - 0.5$$

Thus, the modified command modulation factors mu_a_c* and mu_b_c* are determined by subtracting 0.5, respectively, from the first and second instantaneous command modulation factors mu_a* and mu_b*.

PWM pulse generating section 47 performs calculation 4 shown in FIG. 4. FIG. 5A is a view for illustrating operations of PWM pulse generating section 47. A first carrier shown in FIG. 5A is a carrier used for first power source 10a in generating PWM pulses from the voltage Vdc_a of first power source 10a, in accordance with modified command modulation factor mu_a_c*; and a second carrier shown in FIG. 5A is a carrier used for second power source 10b in generating PWM pulses from the voltage Vdc_b of second power source 10b, in accordance with modified command modulation rate mu_b_c*. The first and second carriers are so adjusted that the phases are inverted.

A first PWM pulse signal Vu_pwm1 is produced by comparison of the first carrier for first power source 10a with the first modified modulation factor mu_a_c*; and a second PWM pulse signal Vu_pwm2 is produced by comparison of the second carrier for second power source 10b with the second modified modulation factor mu_b_c*. A third PWM pulse signal vu_pwm3 is produced by the NOR operation of Vu_pwm1 and Vu_pwm2. The thus-produced first, second and third PWM pulse signals are applied, respectively, to first, second and third switches SW1, SW2 and SW3 shown in FIG. 3.

By this method, one PWM period Tpwm is divided into a first half time Tp1 allotted to a pulse produced on the basis of the first modified command modulation factor mu_a_c* for first power source 10a, and a second half time Tp2 allotted to a pulse produced on the basis of the second modified command modulation factor mu_b_c* for second power source 10b. That is:

$$Tp1=Tp2=Tpwm/2$$

Moreover, since the carriers are inverted, an ON pulse of the first pulse signal Vu_pwm1 generated from the voltage of first power source 10a is produced in each of a starting interval and an ending interval within one PWM cycle; whereas an ON pulse of the second pulse signal Vu_pwm2 generated from the voltage of second power source 10b is produced at the middle of the PWM cycle between the two ON pulses of the first pulse signal Vu_pwm1 in the starting and ending intervals. Therefore, the PWM pulse generating section 47 can produce pulse signals of any desired ON duty over the range of the ON duty from 0% to 100%.

Figure 11:
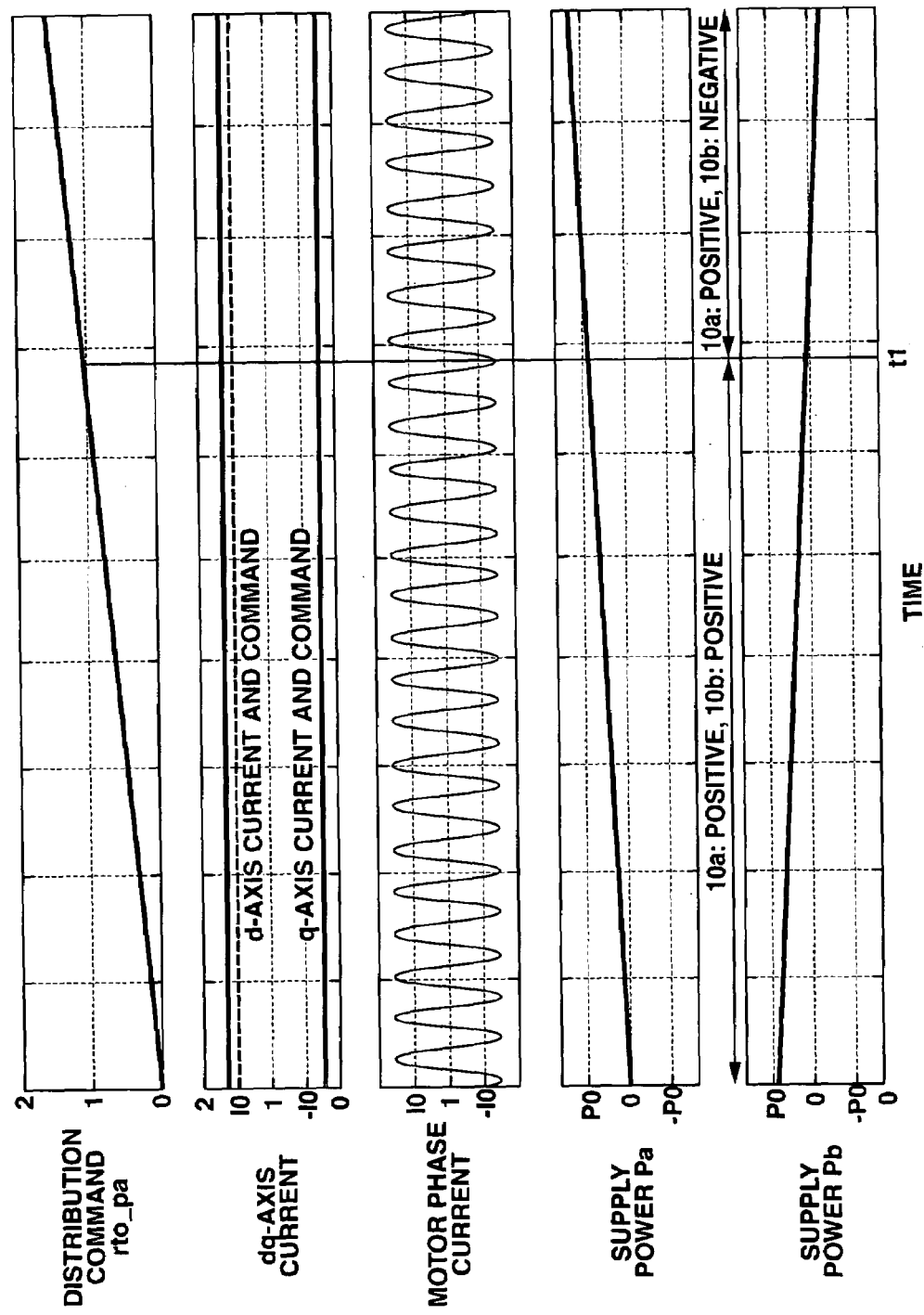
FIG. 11 is a timing chart illustrating simulation results of the power conversion system of FIG. 1.

FIG. 11 shows simulation results in the case in which the motor is driven by the control system according to the first embodiment. In the example shown in FIG. 11, the motor is driven at a constant torque and a constant speed, and the voltage distribution command rto_pa for first source 10a is increased gradually from zero (and accordingly the voltage distribution command rto_pb for second source 10b is decreased gradually from one). Even if power is varied, the torque follows the command because the d-axis and q-axis currents match the d-axis and q-axis command currents. As commanded by the voltage distribution command, the power Pa supplied from first source 10a is increased gradually while the power Pb supplied from second power source 10b is decreased gradually. Until an instant t1, the signs of Pa and Pb are the same. In this state, first and second sources 10a and 10b share in supplying power to motor 20. After t1, the command is such that Pa is positive and Pb is negative. In this case, too, Pa and Pb are varied as commanded. In this state, first source 10a supplies power beyond the motor output, and an unused portion is supplied to second source 10b for regeneration (for charging, that is). Thus, the motor control system according to this embodiment can control the motor torque as commanded, and controls power supplies from two or more sources as desired.

2nd Embodiment

Figure 5B:
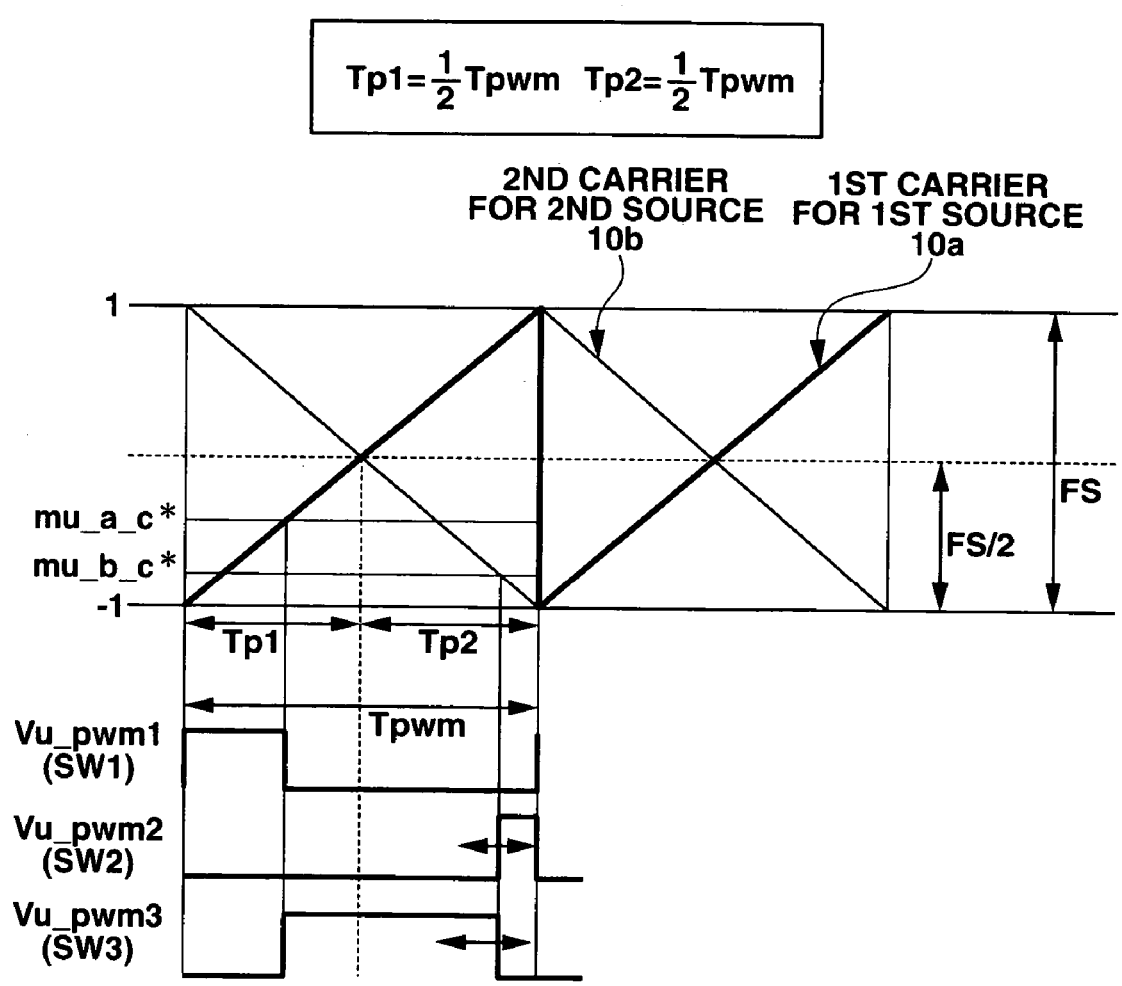
FIG. 5B is a timing chart showing a PWM pulse generating method according to the second embodiment shown in FIG. 2B.

FIG. 2B is a functional block diagram showing part of control unit 40 according to a second embodiment, and FIG. 5B is a timing chart for illustrating the PWM pulse generating method in the second embodiment. The control unit shown in FIG. 2B of the second embodiment is different from that of FIG. 2A of the first embodiment in a PWM pulse generating section 47a. The calculation 4 shown in the fourth step of FIG. 4 is different from that of the first embodiment, in the following manner.

FIG. 5B is a view for illustrating operations of PWM pulse generating section 47a. First carrier shown in FIG. 5B is a sawtooth carrier for generating PWM pulses to produce voltage pulses from the voltage Vdc_a of first power source 10a; and second carrier is a sawtooth carrier for generating PWM pulses to produce voltage pulses from the voltage Vdc_b of second power source 10b, to drive the switches. The first and second sawtooth carriers linearly rise and fall alternately between an upper limit of +1 and a lower limit of −1, in such a symmetrical manner that one is a mirror image of the other and the upper apex of one carrier is coincident with the lower apex of the other carrier.

PWM pulse generating section 47a (like the section 47 of FIG. 2A) produces first PWM pulse signal vu_pwm1 by comparing the first carrier for first power source 10a with the first modified command modulation factor mu_a_c*. The first pulse signal Vu_pwm1 is ON (Vu_pwm1=ON) if mu_a_c*≧first carrier; and Vu_pwm1 is OFF (Vu_pwm1=OFF) if mu_a_c*≦first carrier. Similarly, PWM pulse generating section 47a (like section 47 of FIG. 2A) produces second PWM pulse signal Vu_pwm2 by comparing the second carrier for second power source 10b with the second modified command modulation factor mu_b_c*. The second pulse signal Vu_pwm2 is ON (Vu_pwm2=ON) if mu_b_c*>second carrier; and Vu_pwm2 is OFF (Vu_pwm2=OFF) if mu_b_c*≦second carrier. In this way, PWM pulse generating section 47a produces the first and second pulse signals Vu_pwm1 and Vu_pwm2 and the third pulse signal Vu_pwm3 (NOR of Vu_pwm1 and Vu_pwm2). The thus-produced first, second and third PWM pulse signals are applied, respectively, to first, second and third switches SW1, SW2 and SW3 shown in FIG. 3.

Since the first carrier for first power source 10a and second carrier for second power source 10b are symmetrical within one PWM cycle, an ON pulse of the first pulse signal Vu_pwm1 is generated, for the voltage of first power source 10a, in a starting interval within one PWM cycle; whereas an ON pulse of the second pulse signal Vu_pwm2 is produced, for the voltage of second power source 10b, in an ending interval of the PWM cycle. Thus, the on pulses of Vu_pwm1 and Vu_pwm2 are produced at terminal portions of the PWM cycle continuously. Consequently, one pulse is formed within one PWM cycle for Vu-pwm3 which is NOR of Vu_pwm1 and Vu_pwm2. Therefore, the numbers of switching operations of switches SW1, SW2 and SW3 are equal to one another for each PWM period, and the losses due to switching operations are approximately uniform among the switches. By this method, one PWM period Tpwm is divided into a first half time Tp1 allotted to a pulse produced on the basis of the first modified command modulation factor mu_a_c* for first power source 10a, and a second half time Tp2 allotted to a pulse produced on the basis of the second modified command modulation factor mu_b_c* for second power source 10b. That is:
Tp1=Tp2=Tpwm/2

3rd Embodiment

Figure 6:
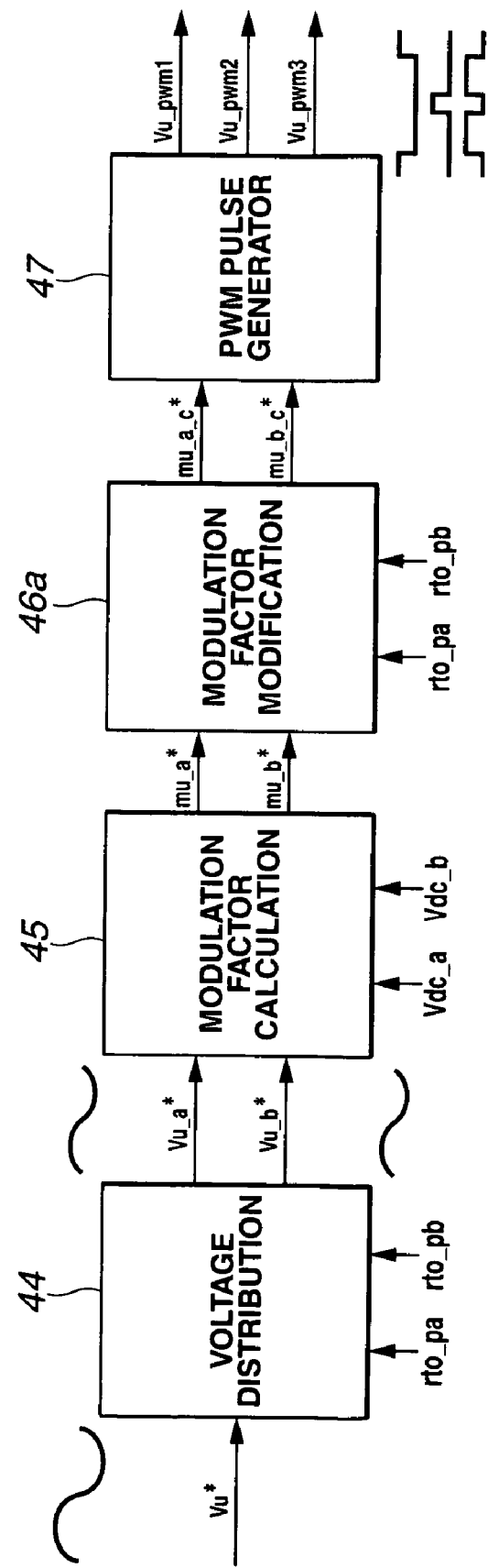
FIG. 6 is a functional block diagram showing a third embodiment of the present invention.
Figure 12:
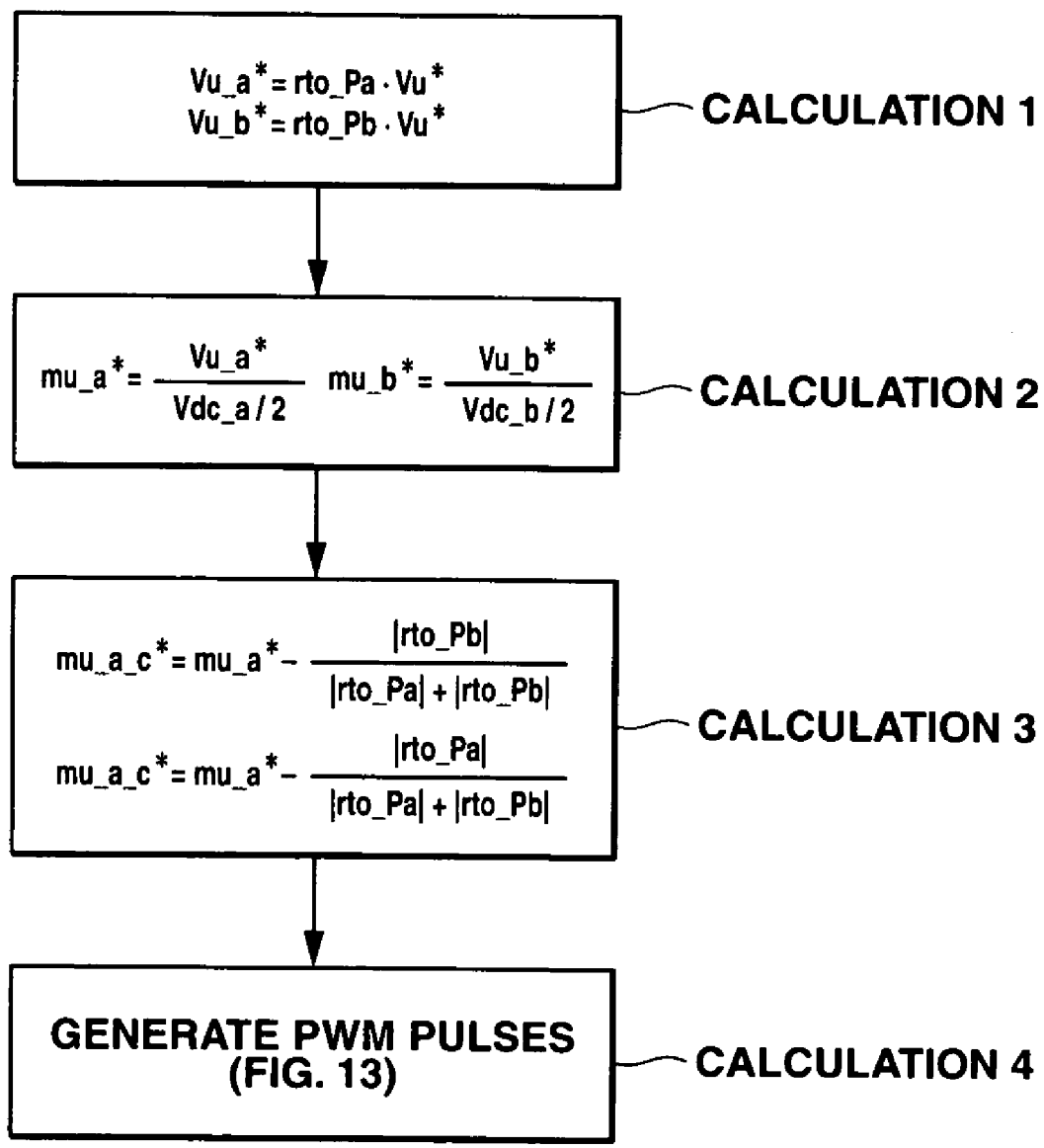
FIG. 12 is a flowchart showing a control process performed by the control unit shown in FIG. 6 according to the third embodiment, and composed of calculation steps corresponding to blocks shown in FIG. 6.
Figure 13:
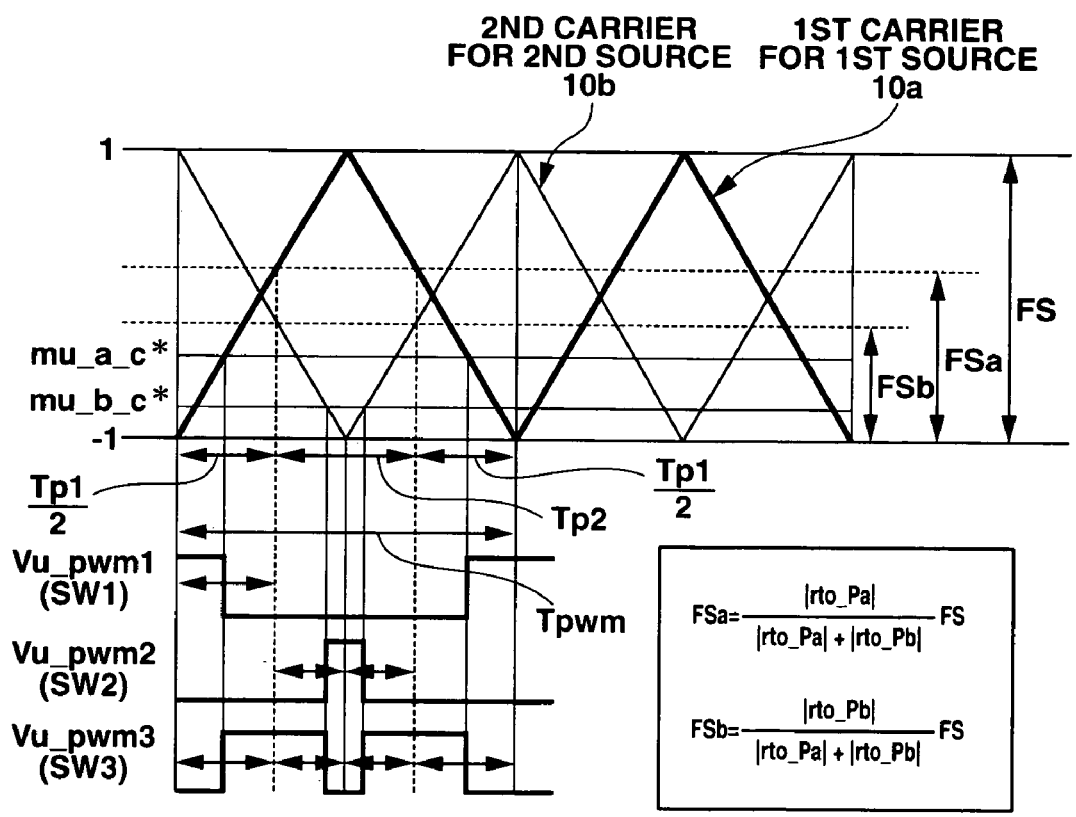
FIG. 13 is a timing chart showing a PWM pulse generating method according to the third embodiment shown in FIG. 7
Figure 14:
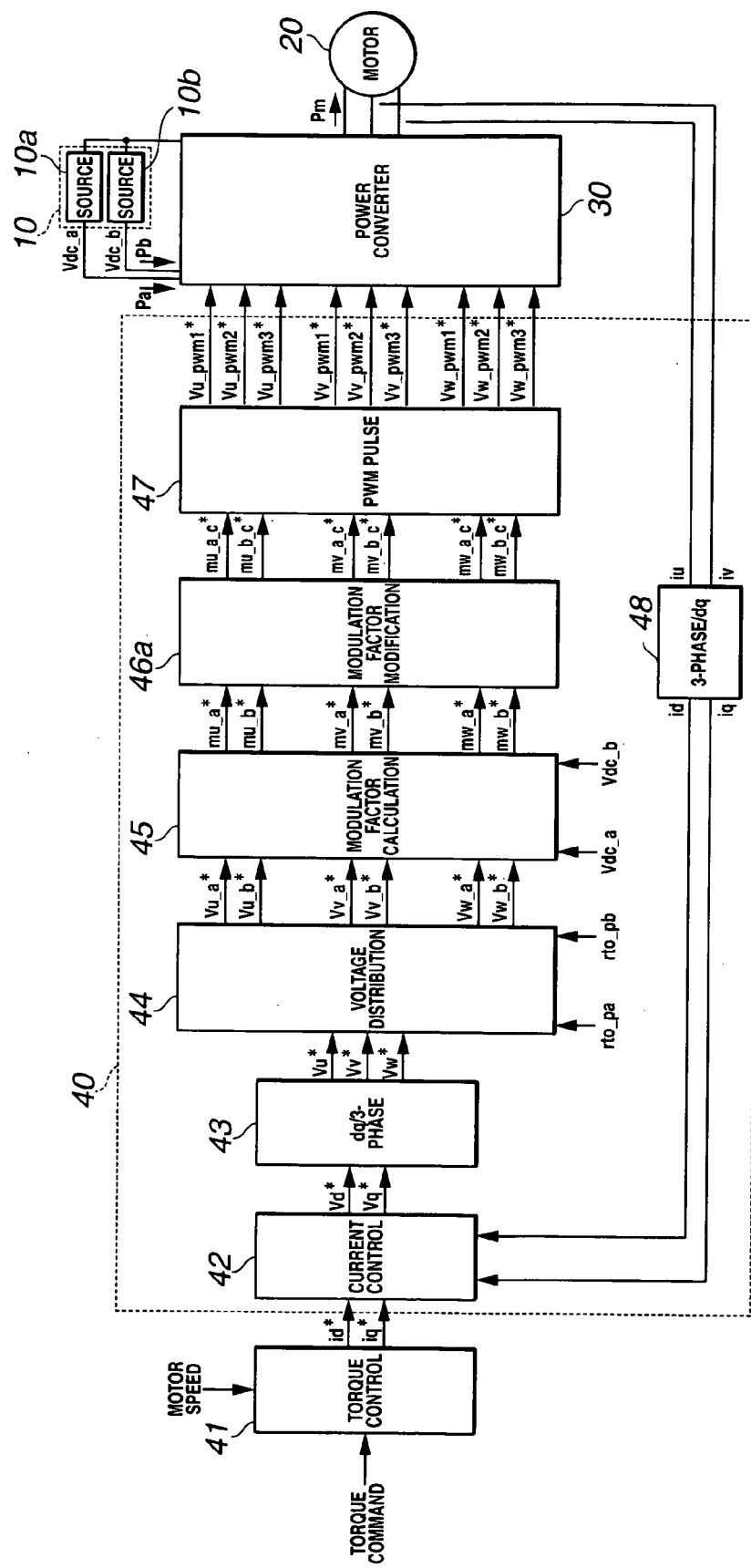
FIG. 14 is a block diagram showing the motor drive system according to the third embodiment of the present invention.

FIG. 14 is a functional block diagram showing a motor drive system according to a third embodiment. The motor drive system according to the third embodiment is different from that of the first embodiment in a modulation factor modifying section 46a. In the other respects, the motor drive system of the third embodiment is substantially identical to the motor drive system of the first embodiment. In the first embodiment, the first time Tp1 allotted to a pulse produced on the basis of the first modified command modulation factor mu_a_c* for first power source 10a is equal to the second time Tp2 allotted to a pulse produced on the basis of the second modified command modulation factor mu_b_c* for second power source 10b, and Tp1=Tp2=Tpwm/2. In the third embodiment, by contrast, the motor control system is configured to vary the first time (interval) Tp1 and second time (interval) Tp2 in accordance with the voltage distribution commands rto_pa and rto_pb, so as to utilize the dc source voltages efficiently when the voltage distribution commands rto_pa and rto_pb are different largely from each other. FIGS. 6, 12 and 13 illustrate the motor drive system of the third embodiment.

FIG. 6 is a functional block diagrams showing part of the control unit 40 shown in FIG. 14 according to the third embodiment. A modulation factor modifying section 46a shown in FIG. 6 performs calculation 3a shown in FIG. 12. That is:

$$mu\_a\_c^* = mu\_a^* - \{(|rto\_Pb|)/(|rto\_Pa|+|rto\_Pb|)$$

$$mu\_b\_c^* = mu\_b^* - \{(|rto\_Pa|)/(|rto\_Pa|+|rto\_Pb|)$$

Thus, this system can increase the voltage generated from the power source for which the power distribution command is greater, by modifying each of the instantaneous command modulation factors mu_a* and mu_b* by multiplication of a value corresponding to the power distribution command, and subtraction of an offset value.

PMW pulse generating section 47 performs calculation 4 shown in FIG. 12, as illustrated in FIG. 13. Though the calculation is the same as the calculation of PWM pulse generating section 47 in the first embodiment, the outputs mu_a_c* and mu_b_c* of modulation factor modifying section 46a are unequal to those of the first embodiment, and hence the produced PWM pulses are different from those of the first embodiment. In the first embodiment, the time Tp1 allotted to pulses produced on the basis of the first modified command modulation factor mu_a_c* for first power source 10a, and the time Tp2 allotted to pulses produced on the basis of the second modified command modulation factor mu_b_c* for second power source 10b are equal to each other, and each fixed equal to Tpwm/2. In the third embodiment, by contrast, Tp1 and Tp2 are varied in accordance with the output voltage distribution ratio. Thus, the system of the third embodiment can increase the ON time of a pulse produced from the source from which a greater amount of power is taken out, up to a maximum of Tpwm, and decrease the ON time of a pulse produced from the source from which a smaller amount of power is taken out, up to a minimum of zero. Therefore, the system can utilize the source voltages effectively even when the two target distribution output powers are different largely from each other.

In the calculation 3a, rto_pa and rto_pb can be replaced by rto_pa' and rto_pb'. For example:

rto_pa'=rto_pa(rto_pa<−0.2, 0.2<rto_pa<0.8)

0.8 (0.8=<rto_pa)

0.2 (−0.2=<rto_pa<=0.2)

rto_pb'=rto_pb(rto_pb<−0.2, 0.2<rto_pb<0.8)

0.8 (0.8=<rto_pb)

0.2 (−0.2=<rto_pb<=0.2)

By using the thus-set rto_pa' and rto_pb', the system can prevent elimination of a pulse generated from one of the power sources, and avoid a problem of audible sound by decreasing the number of switching operations. In this way, the system of the third embodiment can utilize the source voltages effectively even when the two target distribution output powers are different largely from each other.

4th Embodiment

Figure 17B:
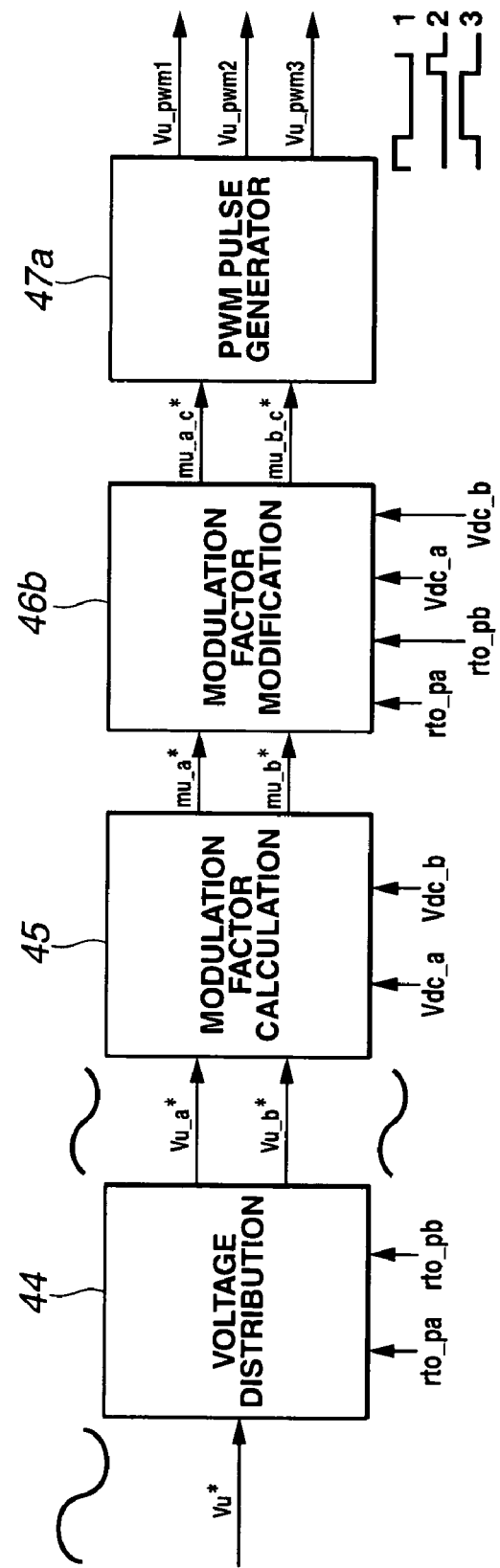
FIG. 17B is a functional block diagram showing a main part of the control unit according to a fifth embodiment.
Figure 18:
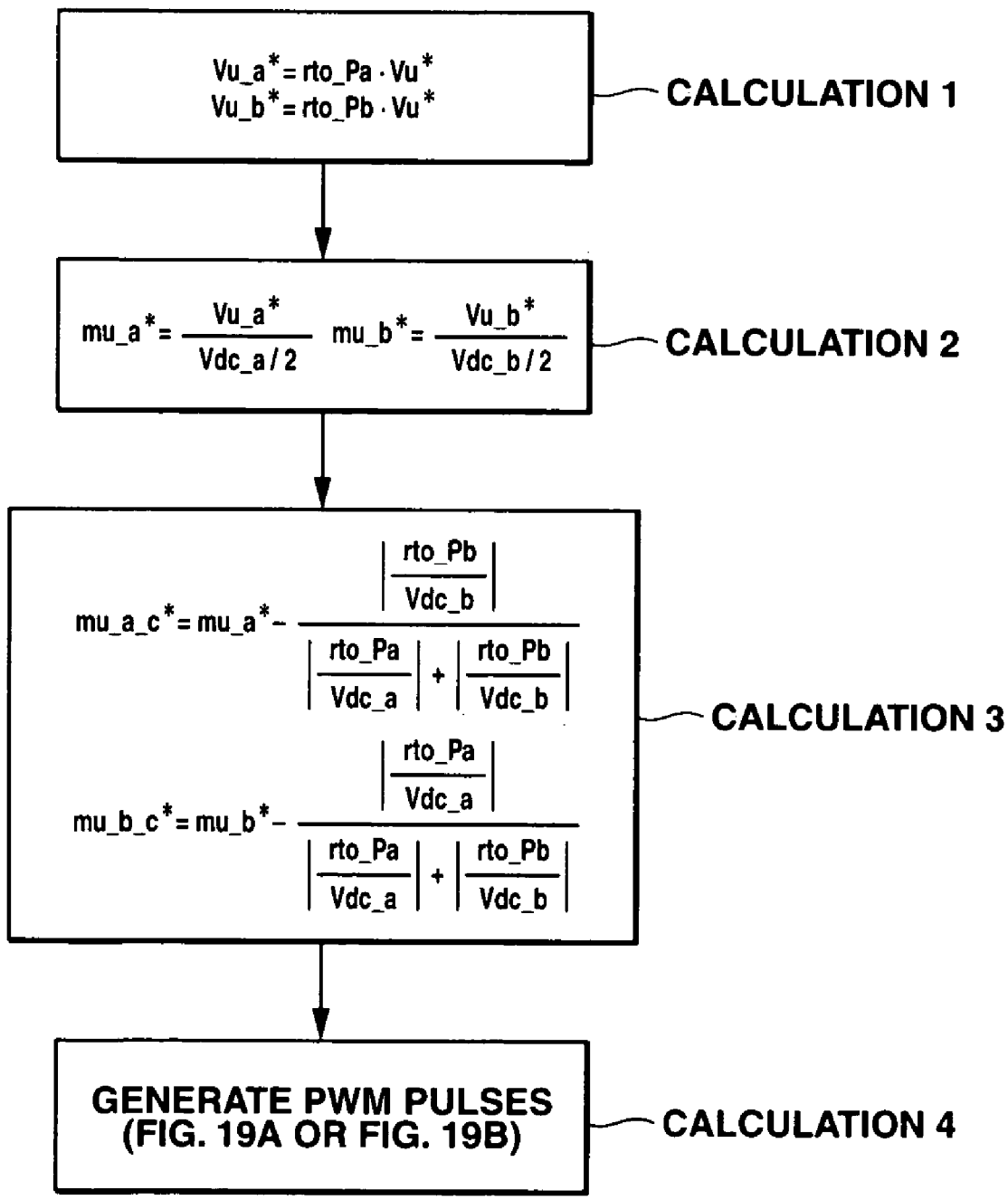
FIG. 18 is a flowchart showing a control process performed by the control unit according to one of the fourth and fifth embodiments, and composed of steps corresponding to blocks shown in FIG. 17A or 17B.
Figure 19A:
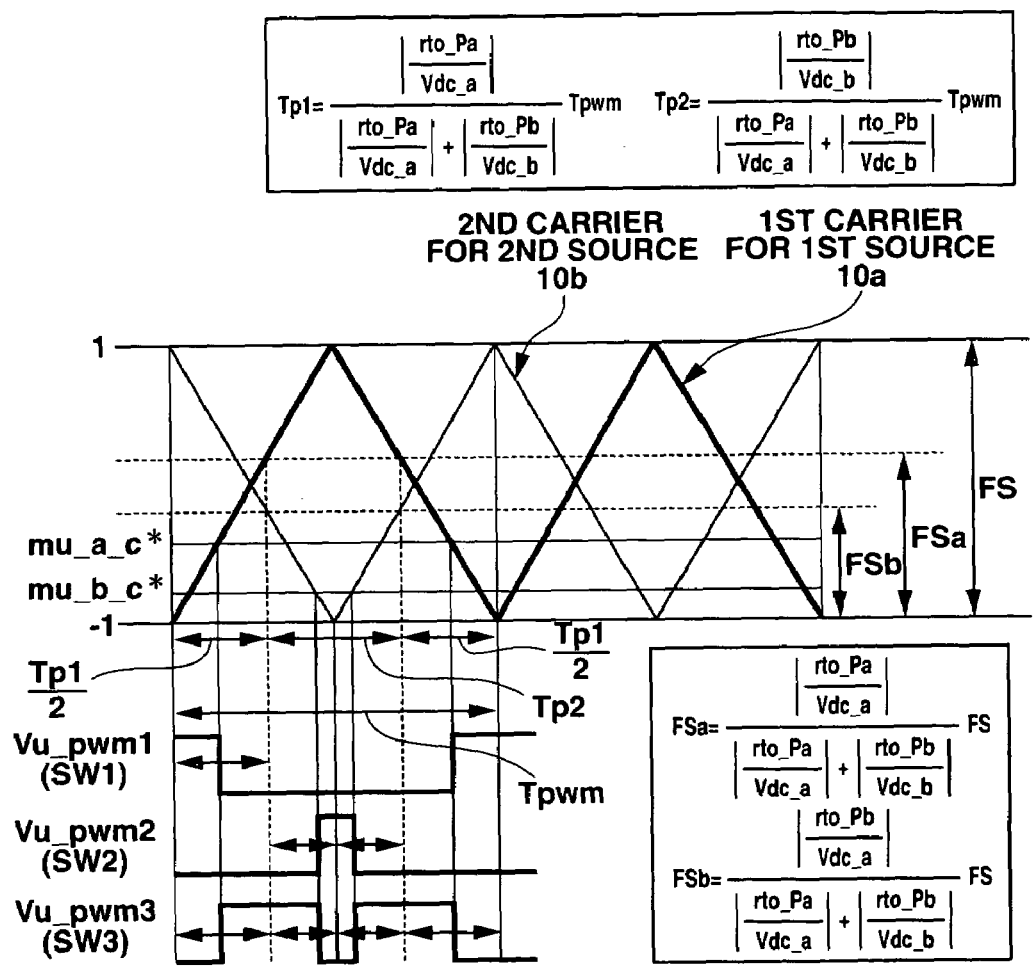
FIG. 19A is a timing chart showing a PWM pulse generating method according to the fourth embodiment shown in FIG. 17A.

FIG. 17A is a functional block diagram showing part of a control unit 40 according to a fourth embodiment of the present invention. FIG. 18 is a flowchart for illustrating calculations performed in the sections shown in FIG. 17A (and in FIG. 17B as explained later). FIG. 19A is a timing chart for illustrating generation of PWM pulses in the fourth embodiment. The control unit of the fourth embodiment is different from that of the third embodiment in a modulation factor modifying section 46a (calculation 3b). Modulation factor modifying section 46a modifies the instantaneous command modulation factors by performing a modification with the voltages of the dc power sources in addition to a modification with the target distribution powers, so as to utilize the source voltages effectively. The calculation 3b of the fourth embodiment is the same as that of a fifth embodiment as explained below. However, carriers are different from those of the fifth embodiment, and therefore, the system generates PEM pulses differently.

5th Embodiment

Figure 19B:
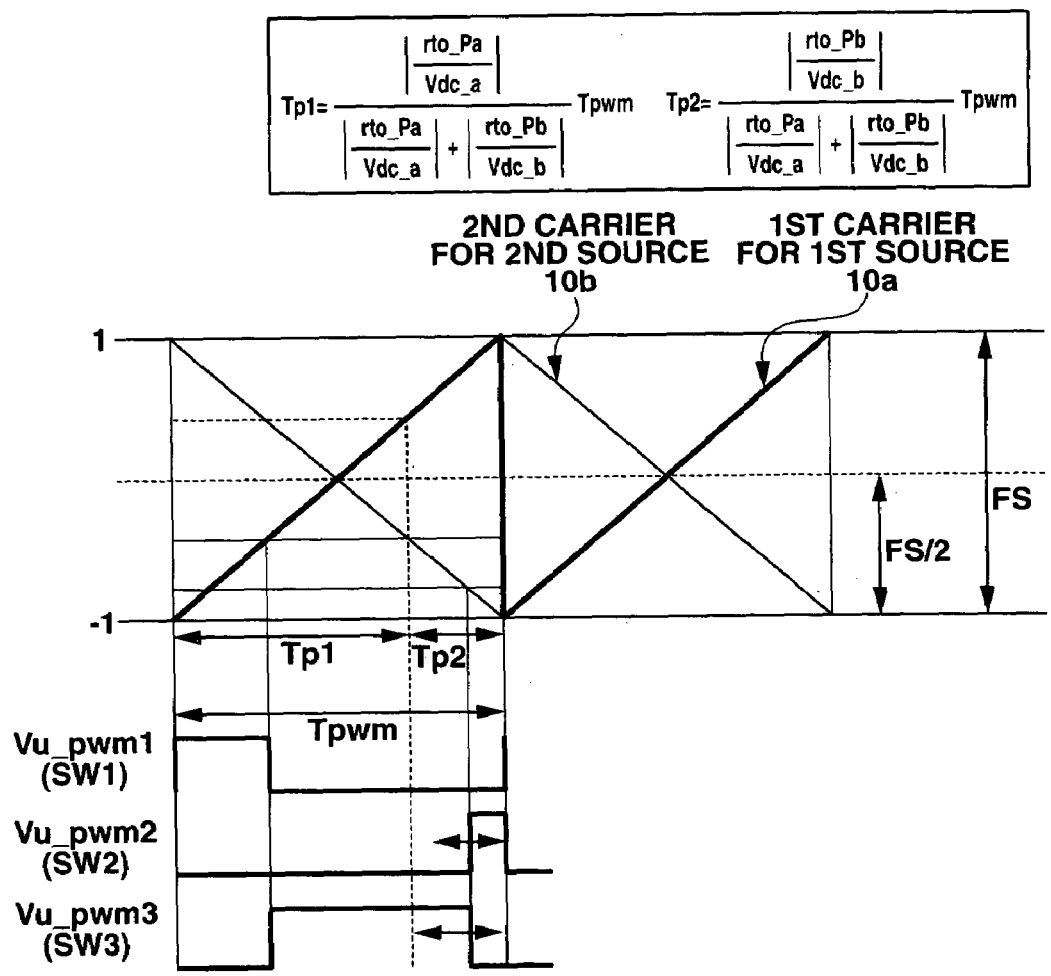
FIG. 19B is a timing chart showing a PWM pulse generating method according to the fifth embodiment shown in FIG. 17B.

FIG. 17B is a functional block diagram showing part of a control unit 40 according to a fifth embodiment. The flowchart of FIG. 18 illustrates the calculations performed in the sections shown in FIG. 17B as well as the calculations of FIG. 17A. FIG. 19B is a timing chart for illustrating generation of PWM pulses in the fifth embodiment. The control unit of the fifth embodiment is different from that of the first embodiment in a modulation factor modifying section 46b (calculation 3b). In the other respects, the fifth embodiment is the same as the first embodiment. Modulation factor modifying section 46b modifies the instantaneous command modulation factors by using the source voltages Vdc_a and Vdc_b and the target power distribution command rto_pa and rto_pb according to the following equations.

$$mu\_a\_c^* = mu\_a^* - \frac{\left|\frac{rto\_pb}{Vdc\_b}\right|}{\left|\frac{rto\_pa}{Vdc\_a}\right| + \left|\frac{rto\_pb}{Vdc\_b}\right|} \quad (1)$$

$$mu\_b\_c^* = mu\_b^* - \frac{\left|\frac{rto\_pa}{Vdc\_b}\right|}{\left|\frac{rto\_pa}{Vdc\_a}\right| + \left|\frac{rto\_pb}{Vdc\_b}\right|} \quad (2)$$

In this way, this system can increase the voltage generated from the power source for which the power distribution command is greater, by modifying each of the instantaneous command modulation factors mu_a* and mu_b* by multiplication of a value corresponding to the power distribution command, and subtraction of an offset value.

PMW pulse generating section 47a performs a calculation 4 shown in FIG. 18, as illustrated in FIG. 19B. Though the calculation is the same as the calculation of PWM pulse generating section 47 in the first embodiment, the outputs mu_a_c* and mu_b_c* of modulation factor modifying section 46b are unequal to those of the first embodiment, and hence the produced PWM pulses are different from those of the first embodiment. In the first embodiment, the time Tp1 allotted to pulses produced on the basis of the first modified command modulation factor mu_a_c* for first power source 10a, and the time Tp2 allotted to pulses produced on the basis of the second modified command modulation factor mu_b_c* for second power source 10b are equal to each other, and each fixed equal to Tpwm/2. In the fifth embodiment, by contrast, Tp1 and Tp2 are varied in accordance with the output voltage distribution ratio. Thus, the system of the fifth embodiment can increase the ON time of a pulse produced from the source from which a greater amount of power is taken out, up to a maximum of Tpwm, and decrease the ON time of a pulse produced from the source from which a smaller amount of power is taken out, up to a minimum of zero. Therefore, the system can utilize the source voltages effectively even when the two target distribution output powers are different largely from each other.

When rto_pa=1 and rto_pb=o, the second pulse signal Vu_pwm2 is always OFF, and pulses of Vu_pwm1 and Vu_pwm3 are produced. In this case, too, the switching frequencies of SW1 and SW3 remain unchanged, so that electromagnetic noises are not increased. In this way, the system of the fifth embodiment can utilize the source voltages effectively even when the two target distribution output powers are different largely from each other.

6th Embodiment

Figure 15:
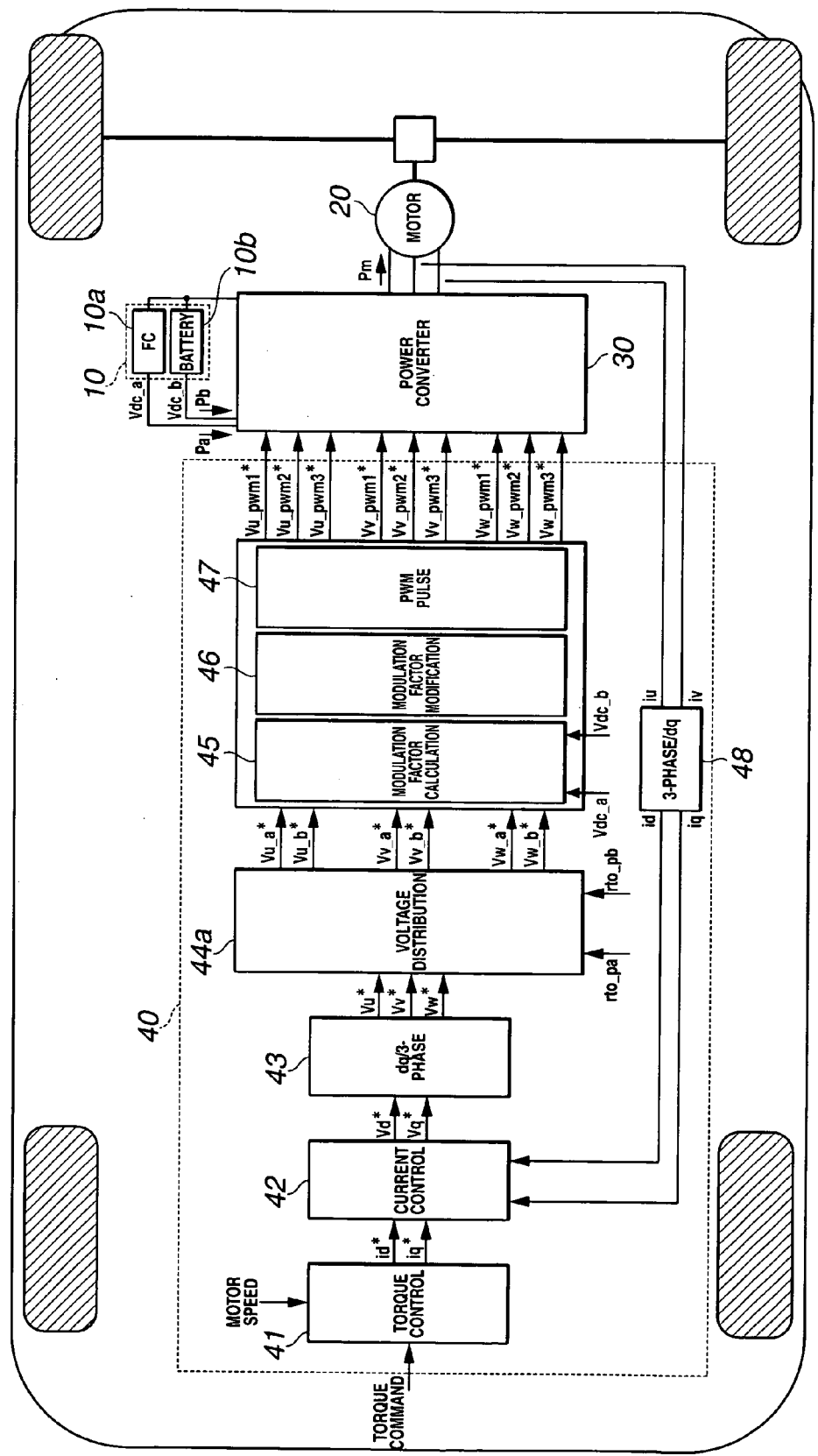
FIG. 15 is a view showing an electric vehicle equipped with a power source including a fuel cell unit and a battery, and a control system according to a sixth embodiment of the present invention.

FIG. 15 shows a fuel cell vehicle equipped with a motor drive system according to the third embodiment. Fuel cell is incapable of accepting regenerative power, likely to vary its efficiency in dependence on an operating point, and less satisfactory in response characteristic. Therefore, it is desirable to use the power of fuel cell and the power of battery as a driving power for motor in controlled proportions. The system of this embodiment can control the proportions of power supplies among the power sources to desired levels, and thereby drive the motor efficiently. In the regenerative operation, the switching circuit of the power converter is set to the switch arrangement for returning the entirety (100%) of power to the battery. In this way, the conversion system according to this embodiment can control the proportions of power supplies among a plurality of different power sources such as fuel cell, battery and capacitor, adequately in accordance with the properties of the power sources. Without the need for a dc—dc converter, this embodiment can reduce the size and loss of the system as in the preceding embodiments.

Figure 16:
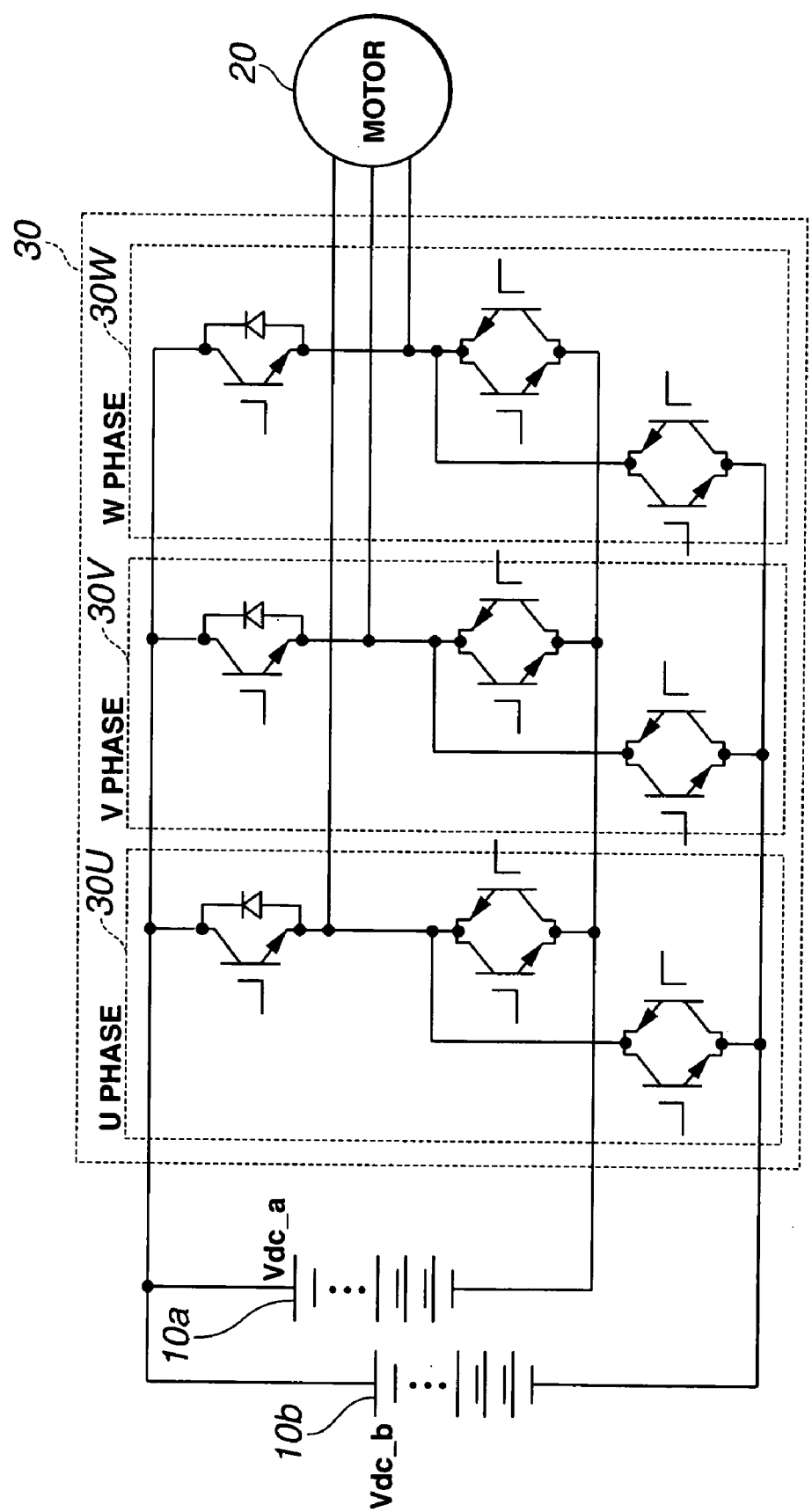
FIG. 16 is a circuit diagram showing the power converter according to a second practical example, which can be used in the present invention.

Although the first through sixth embodiments have been described above by reference to certain embodiments of the invention, the invention is not limited to the embodiments described above. Modifications and variations of the embodiments described above will occur to those skilled in the art in light of the above teachings. In the example shown in FIG. 3, the lower potential sides of the first and second power sources are connected together to provide a common potential (GND). The present invention is not limited to the power converter of this type. It is optional to employ the circuit arrangement shown in FIG. 16 in which the higher potential sides of first and second power sources 10a and 10b are connected together. Moreover, it is possible to employ a capacitor in place of at least one of the power sources. In the example shown in FIG. 15, the multi-output power source employs the fuel cell unit and the battery. The present invention is especially advantageous when employed in such an electric vehicle.

7th Embodiment

Figure 20:
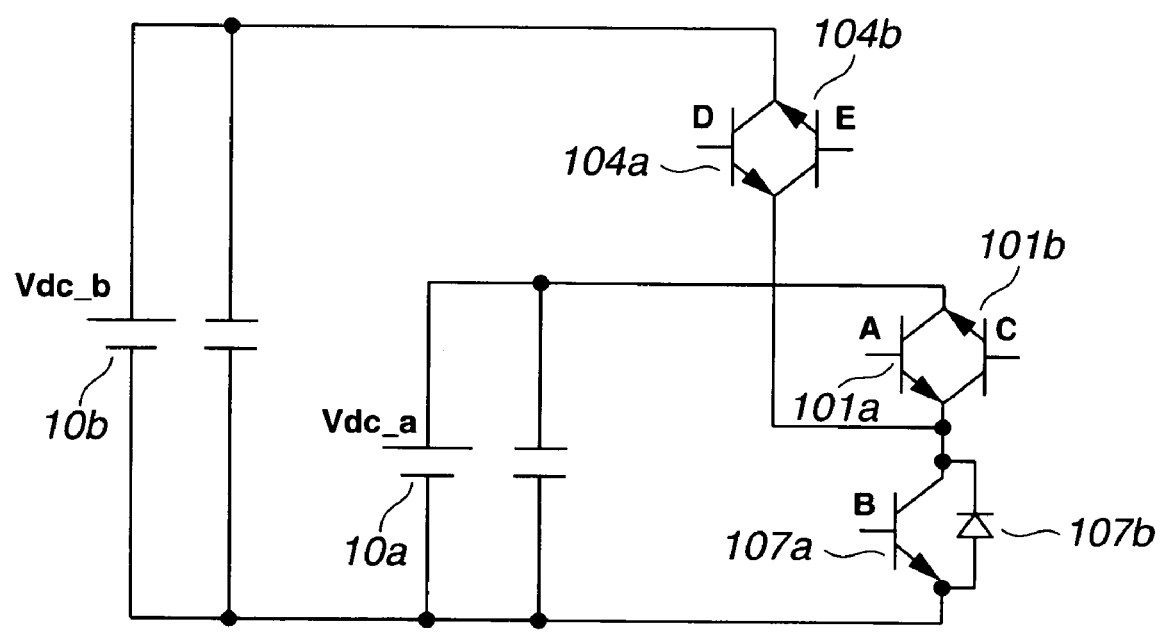
FIG. 20 is a circuit diagram showing a U-phase section of a switching circuit employed in a seventh embodiment of the present invention.

FIGS. 20~23 are views for illustrating a seventh embodiment of the present invention. A control unit 40 according to the seventh embodiment performs the calculations shown in FIG. 18 according to the fifth embodiment, and produces PWM pulses as shown in FIG. 19A. A pulse generating section 47 according to the seventh embodiment produces five switch drive signals A~E for driving switches in the U phase as shown in FIG. 20, by way of example, by using a first triangular carrier for PWM pulses for producing voltage pulses from the first dc source voltage Vdc_a of first power source 10a and a second triangular carrier for PWM pulses for producing voltage pulses from the second dc source voltage Vdc_b of second power source 10b. The first and second triangular carriers are bounded between an upper limit of +1 and a lower limit of −1, and shifted so that the phase difference therebetween is equal to 180°. The five switch drive signals A~E are as follows:

A: Signal for driving a switch for conducting in a direction from power source 10a to an output terminal.

B: Signal for driving a switch for conducting in a direction from the output terminal to the negative terminal.

C: Signal for driving a switch for conducting in a direction from the output terminal to power source 10a.

D: Signal for driving a switch for conducting in a direction from power source 10b to the output terminal.

E: Signal for driving a switch for conducting in a direction from the output terminal to power source 10b.

To produce a voltage pulse from source 10a, the system turns on A. When there is a potential difference between the positive electrode and the positive electrode, and the Vdc_a>Vdc_b, then there can be formed a short circuit allowing a current between the positive electrodes when A and E are both tuned on. When semiconductor switches are employed for these switches, there is a delay in a switching operation from OFF to ON. When, for example, A is turned from ON to OFF and simultaneously E is turned from OFF to ON, A takes time to turn on completely, and the on time of A may overlap the on time of E. During this overlap period, A and E are both ON, and a short circuit current flows and increases the amount of heat generation in the semiconductor switch. To prevent such an increase in the heat generation, the pulse generating section 47 of this embodiment performs switching operations of drive signals A and E after the elapse of an off time during which A and E are both turned off, by adding a short circuit preventing time period (or dead time) to the drive signals. Like the addition of the dead time to the drive signals A and E, the system can add a dead time to drive signals E and C to prevent a short circuit between the positive electrodes, and a dead time to the drive signals A and B, and the drive signals E and B to prevent a short circuit between the positive electrode and negative electrode.

Figure 21:
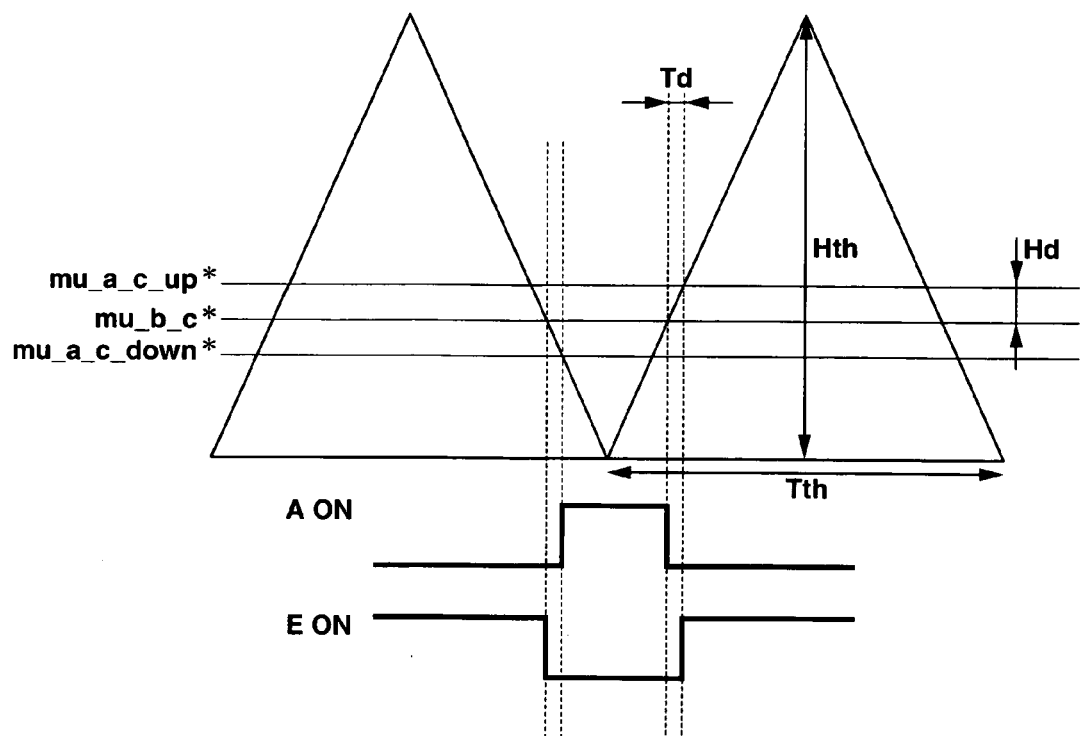
FIG. 21 is a view illustrating a method for generating pulse signals A and E in the seventh embodiment by the comparison with a triangular wave.

PWM pulse generating section 47 of this embodiment provides a dead time to the drive signals A and E, for example, as shown in FIG. 21. Offset signals mu_a_c_up* and mu_a_c_down* are produced from mu_a_c* to provide a dead time.

$$mu\_a\_c\_up^* = mu\_a\_c^* + Hd$$

$$mu\_a\_c\_down^* = mu\_a\_c^* - Hd$$

In these equations, Hd is determined from an amplitude Htr of the triangle waveform (between the base and the apex), the period Ttr of the triangle waveform, and a dead time Td, as follows:

$$Hd = 2Td \cdot Htr/Ttr$$

PWM pulse generating section 47 produces the drive signals A and E by the comparison of the triangular carrier with mu_a_c*, mu_a_c_up* and mu_a_c_down* according to the following rule.

A=ON if mu_a_c_down*≧carrier for power source 10a
A=OFF if mu_a_c*≦carrier for power source 10a
E=OFF if mu_a_*≧carrier for power source 10a
E=ON if mu_a_c_up*≦carrier for power source 10a By producing the switch drive signals in this way, the motor drive system can provide the dead time Td between A and E, and thereby prevent a short circuit between the positive electrodes.

Figure 22:
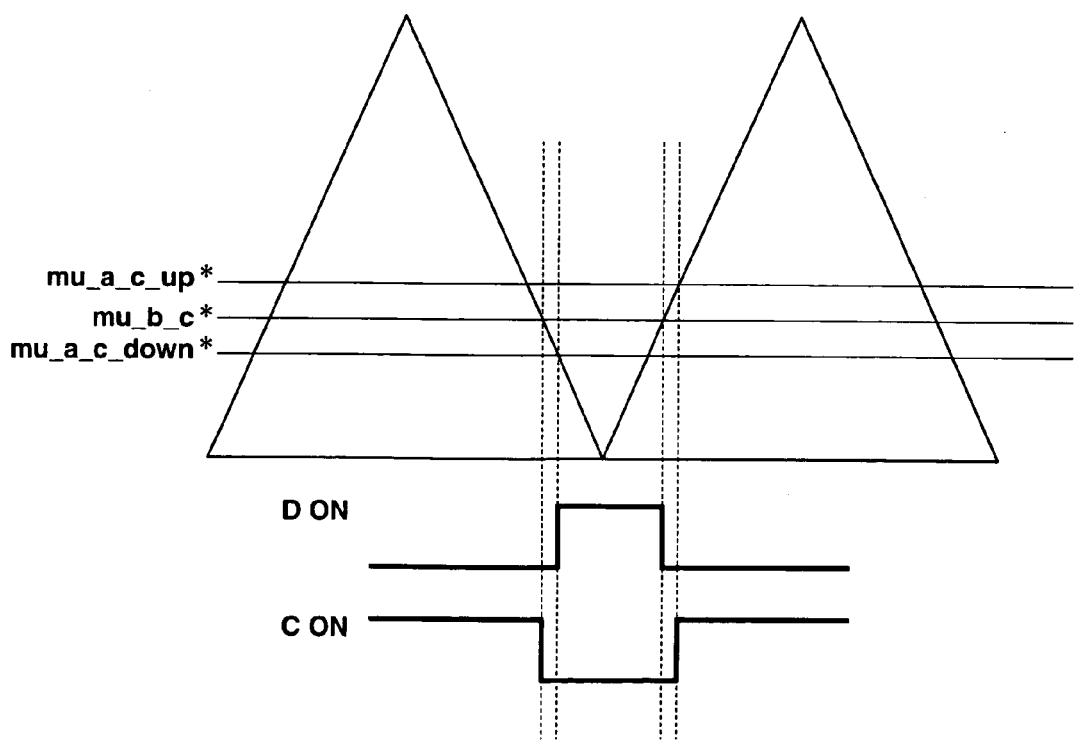
FIG. 22 is a view illustrating a method for generating pulse signals D and C in the seventh embodiment by the comparison with the triangular wave.

PWM pulse generating section 47 produces PWM pulses for producing voltage pulses from second power source 10b, in the same manner, as shown in FIG. 22. PWM pulse generating section 47 determines the following offset signals mu_b_c_up* and mu_b_c_down*, and compares the triangular carrier for second power source 10b, with mu_b_c*, mu_b_c_up* and mu_b_c_down*.

$$mu\_b\_c\_up* = mu\_b\_c* + Hd$$

$$mu\_b\_c\_down* = mu\_b\_c* - Hd$$

The switch drive signals D and C are produced according to the following rule.

D=ON if mu_b_c_down*≧carrier for power source 10b
D=OFF if mu_b_c*≦carrier for power source 10b
C=OFF if mu_b_c*≧carrier for power source 10b
C=ON if mu_b_c_up*≦carrier for power source 10b By producing the switch drive signals in this way, the motor drive system can provide the dead time Td between D and C, and thereby prevent a short circuit between the positive electrodes.

Figure 23:
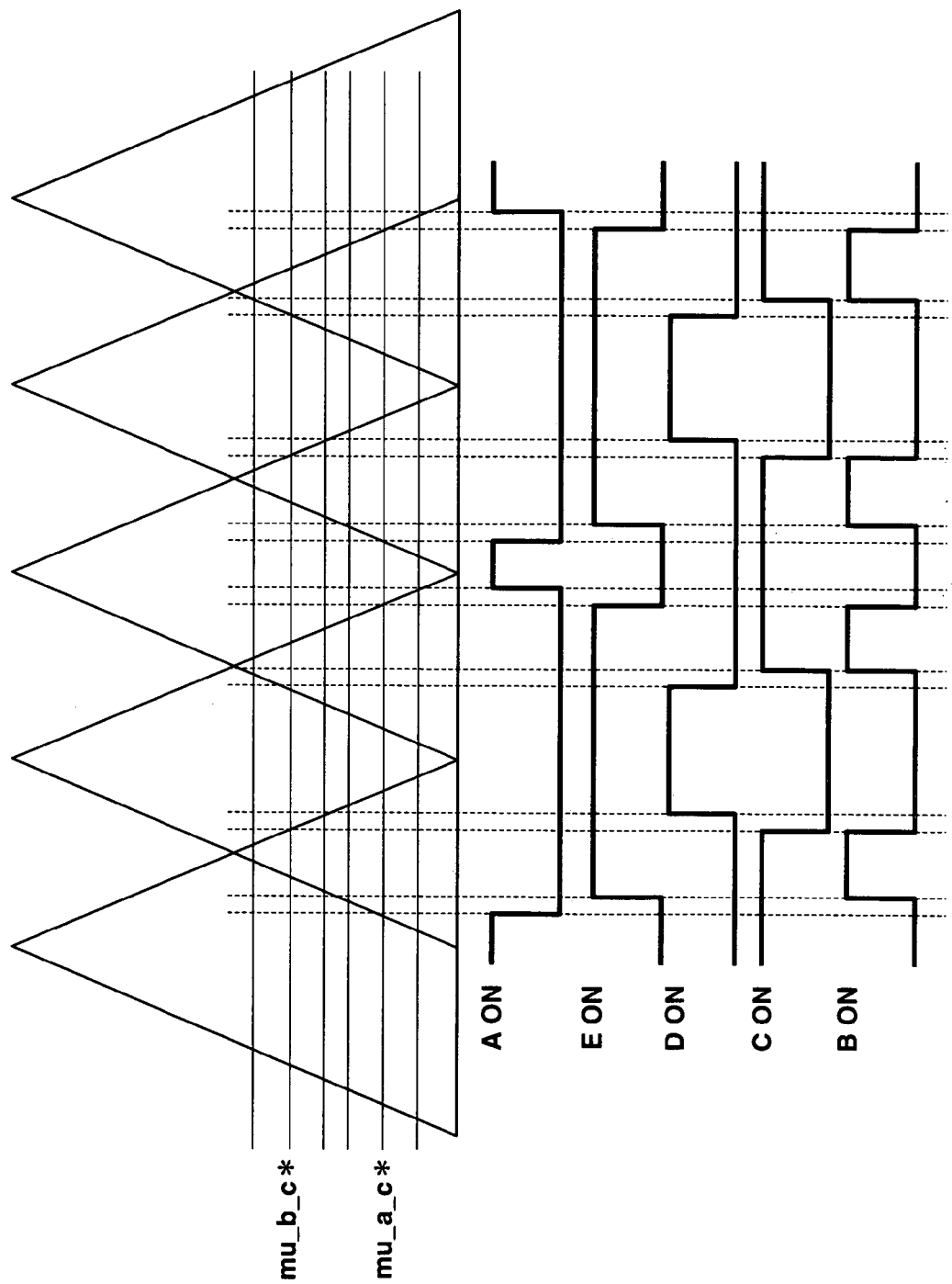
FIG. 23 is a view illustrating pulse signals produced with dead time by the system according to the seventh embodiment.

Drive signal B is produced by the logical multiplication of the produced drive signals E and C. That is: B=E·C Drive signals E and A are produced so as to provide the dead time therebetween, and drive signals C and D are produced so as to provide the dead time therebetween. Therefore, the PWM pulse generating section can further provide a dead time between B and A and between B and E by producing B by the logic multiplication of E and C. FIG. 23 shows one example in which the drive signals are produced with dead times.

The motor drive system of this embodiment can prevent undesired heat generation in the switches by short circuit current by adding the dead time to pulses. Moreover, by employing the logic multiplication, the system can provide the dead time with a simple construction without the need for the operations for providing the dead time between A and B, and between E and B.

8th Embodiment

Figure 24:
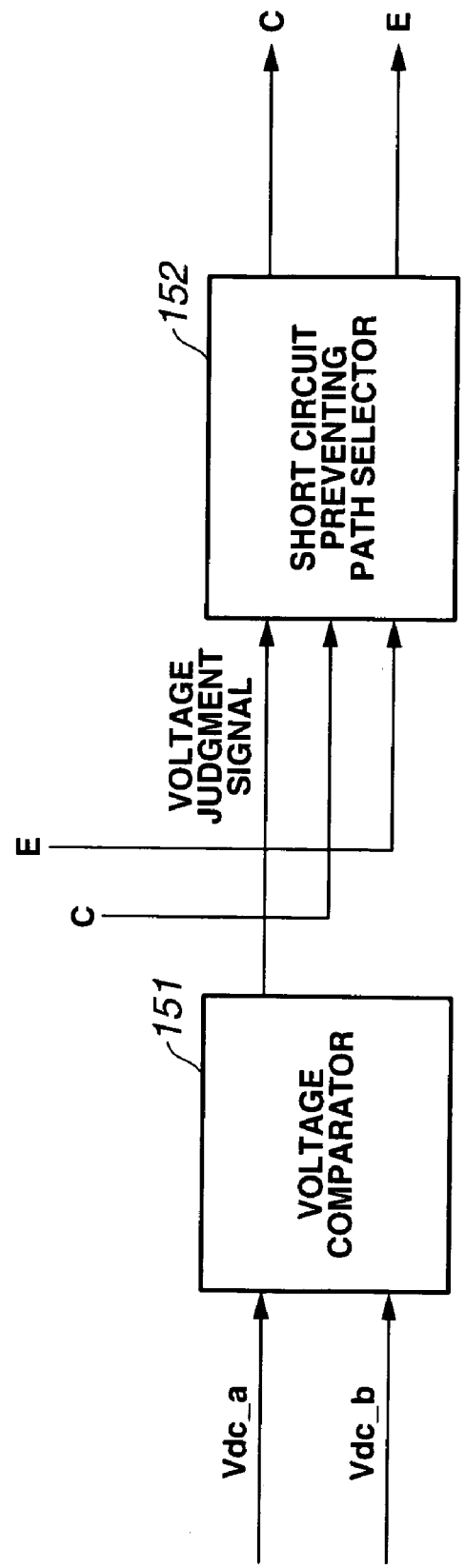
FIG. 24 is a block diagram showing an eighth embodiment of the present invention.

FIGS. 24~26 are views for illustrating an eighth embodiment. The eighth embodiment is the same as the seventh embodiment, excepting the following points. A voltage comparator 151 (serving as means for determining a potential difference) shown in FIG. 24 receives, as inputs, voltage Vdc_a of first power source 10a and voltage Vdc_b of second power source 10b, and delivers, as an output, a voltage judgment signal by comparison between the two inputs. The voltage judgment signal is set to a H level when Vdc_a−Vdc_b>0, and to a L level when Vdc_a−Vdc_b≦0. In this example, voltage comparator 151 performs the voltage comparison by examining Vdc_a−Vdc_b with a hysteresis (for example, by using a threshold having a predetermined width). FIG. 25 shows the construction of voltage comparator 151 employed in this embodiment. A subtracter 153 calculates the voltage difference Vdc_a−Vdc_b, and the output of subtracter 153 is transmitted through a hysteresis controller 154 to produce the voltage judgment signal of the H or L level.

A short circuit preventing path selector 152 shown in FIG. 24 receives the voltage judgment signal, and switch drive signals E and C; and produces renewed drive signals E and C. Short circuit preventing path selector 152 performs logic operations as shown in FIG. 26. When the voltage judgment signal is H, then the renewed drive signal C is ON because of a logic sum with the voltage judgment signal of H. When the voltage judgment signal is L, then the renewed drive signal E is ON. When Vdc_a>Vdc_b and hence the voltage judgment signal is H, a short circuit current can flow between the positive electrodes when signals A and E both turn on, and therefore, there is a need for providing a short circuit preventing time for preventing a short circuit between both power sources. The generation of the short circuit preventing time is performed in the same manner as in the seventh embodiment. When, on the other hand, D and C both turn on while Vdc_a>Vdc_b, no short circuit current flows though the voltage is applied to the switches in this path. Accordingly, there is no need for turning off C from the viewpoint of short circuit prevention. The short circuit prevention by A and E suffices for the short circuit prevention between the positive electrodes, and the short circuit prevention can be achieved while switch C remains ON. Similarly, switch E can be left ON when the voltage judgment signal is L. Thus, by using the voltage judgment signal, the system can hold C or E ON without the need for switching on and off C or E in accordance with the switching frequency of the power converter, and thereby reduce the switching loss.

When the potential difference is close to zero, and noise is involved in the sensed voltage, the noise could switch the voltage judgment signal between H and L, and thereby cause switching operations of E and C. Moreover, when the source voltages fluctuate at approximately equal voltage levels, the addition of the hysteresis can prevent an increase of the switching loss. The addition of the hysteresis might cause the flow of a short circuit current. However, it is possible to decrease the short circuit current to such a low level imparting no influence on the heat generation of the switches, by setting the width of the hysteresis (the threshold for the hysteresis control) adequately.

9th Embodiment

Figure 27:
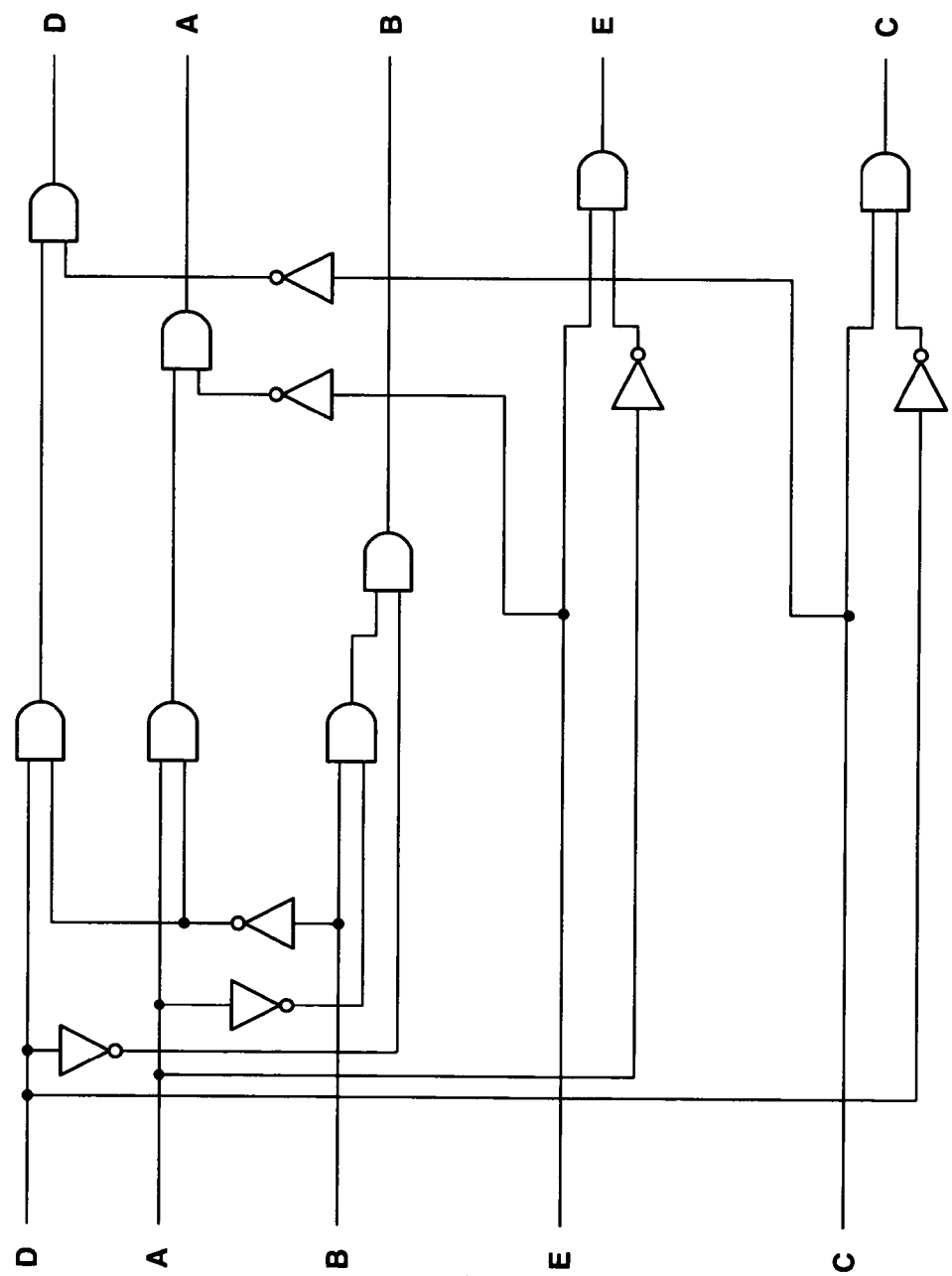
FIG. 27 is a diagram showing a short circuit preventing circuit according to a ninth embodiment of the present invention.

FIG. 27 is a view for illustrating a ninth embodiment. A logic circuit shown in FIG. 27 receives, as inputs, the switch drive signals A~E. As a circuit for preventing a short circuit between the positive electrodes, the drive signals A and E are processed in the following manner. A renewed signal E is produced by the logical multiplication of the logical inversion of A and the original signal E. Conversely, a renewed signal A is produced by the logical multiplication of the logical inversion of E and the original signal A. Consequently, when A and E are both ON, then A and E are replaced by OFF signals. As the other circuit for preventing a short circuit between the positive electrodes, the drive signals D and C are processed in the same manner by a similar logic circuit. As circuits for preventing a short circuit between the positive and negative electrodes, a similar logic circuit replaces A and B by OFF signals when A and B are both ON, and another similar logic circuit replaces D and B by OFF signals when D and B are both ON. With the circuit of FIG. 27, the system can prevent a short circuit between the electrodes, and prevent an increase of the heat generation in the switches.

10th Embodiment

Figure 28:
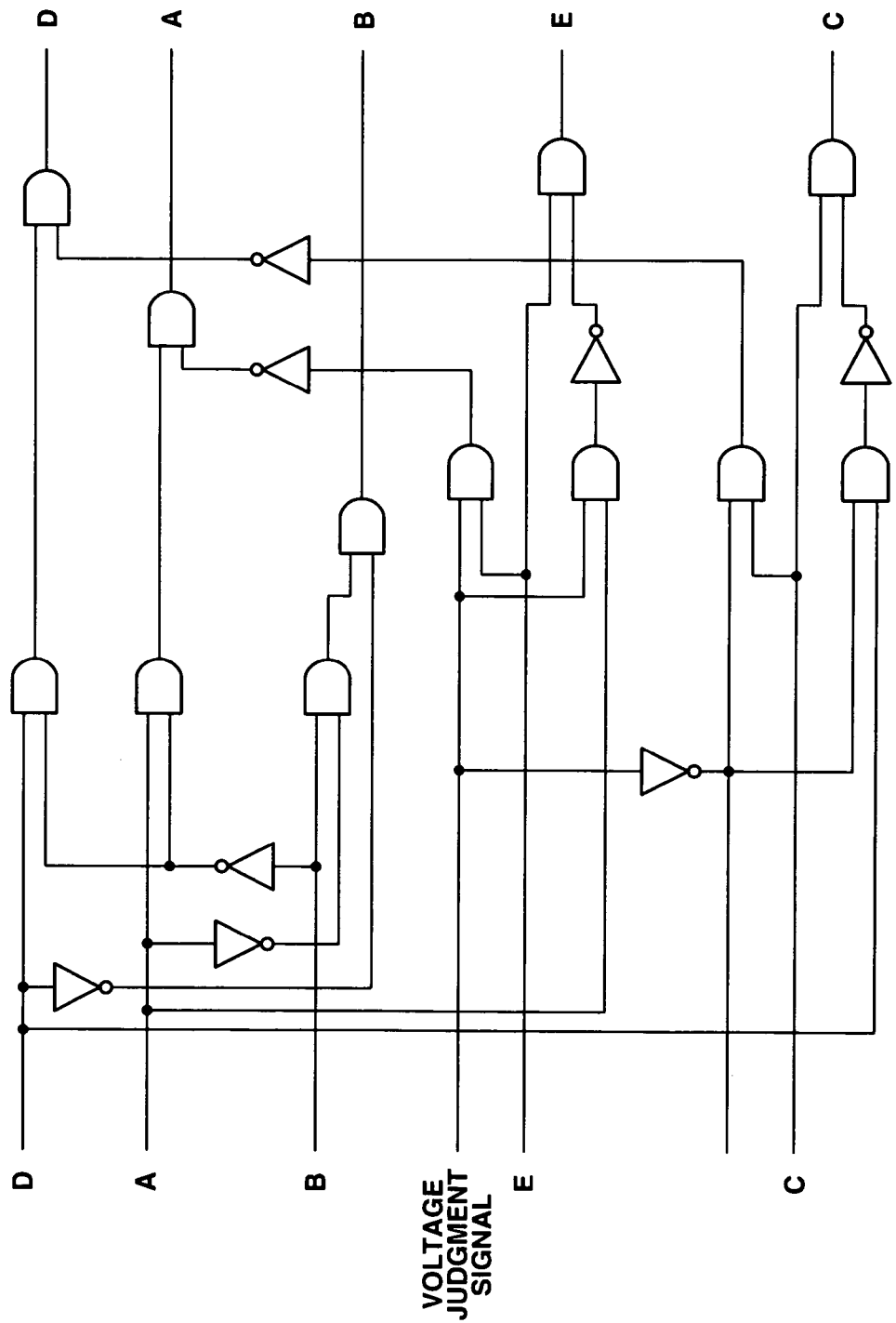
FIG. 28 is a diagram showing a short circuit preventing circuit according to a tenth embodiment of the present invention.

FIG. 28 is a view for illustrating a tenth embodiment. The tenth embodiment is almost identical to the ninth embodiment, and different from the ninth embodiment only in the following points. The voltage judgment signal is set to H when Vdc_a−Vdc_b>0, and to L when Vdc_a−Vdc_b≦0, and this voltage judgment signal is produced by the voltage comparator 151 employed in the eighth embodiment as shown in FIG. 24. The logic circuit of FIG. 28 calculates the logical multiplication of the voltage judgment signal and A, and the logical multiplication of the voltage judgment signal and E. The logic circuit of FIG. 28 further determines the logical multiplication of A and the logic inversion of the output of the logical multiplication of E and the voltage judgment signal; and determines the logical multiplication of E and the logic inversion of the output of the logical multiplication of A and the voltage judgment signal. When A and E turn on simultaneously while Vdc_a−Vdc_b>0, a short circuit current might flow between the positive electrodes. However, the logic circuit of FIG. 28 turns off A and E simultaneously in such a case. When Vdc_a−Vdc_b≦0, and hence the voltage judgment signal is L, the output signals A and E are set to ON by the logic circuit of FIG. 28. However, in this case, no short circuit current flows even if both are turned on simultaneously.

Similarly, the logic circuit of FIG. 28 calculates the logical multiplication of the logic inversion of the voltage judgment signal and C, and the logical multiplication of the logic inversion of the voltage judgment signal and D. The logic circuit of FIG. 28 further determines the logical multiplication of C and the logic inversion of the output of the logical multiplication of D and the logic inversion of the voltage judgment signal; and determines the logical multiplication of D and the logic inversion of the output of the logical multiplication of C and the logic inversion of the voltage judgment signal. With the circuit of FIG. 28, the system can prevent a short circuit between the electrodes, and prevent an increase of the heat generation in the switches. Moreover, the circuit section for the paths requiring no short circuit prevention are held unchanged without the need for additional switching operations. Therefore, the system can reduce the switching loss.

11th Embodiment

Figure 29:
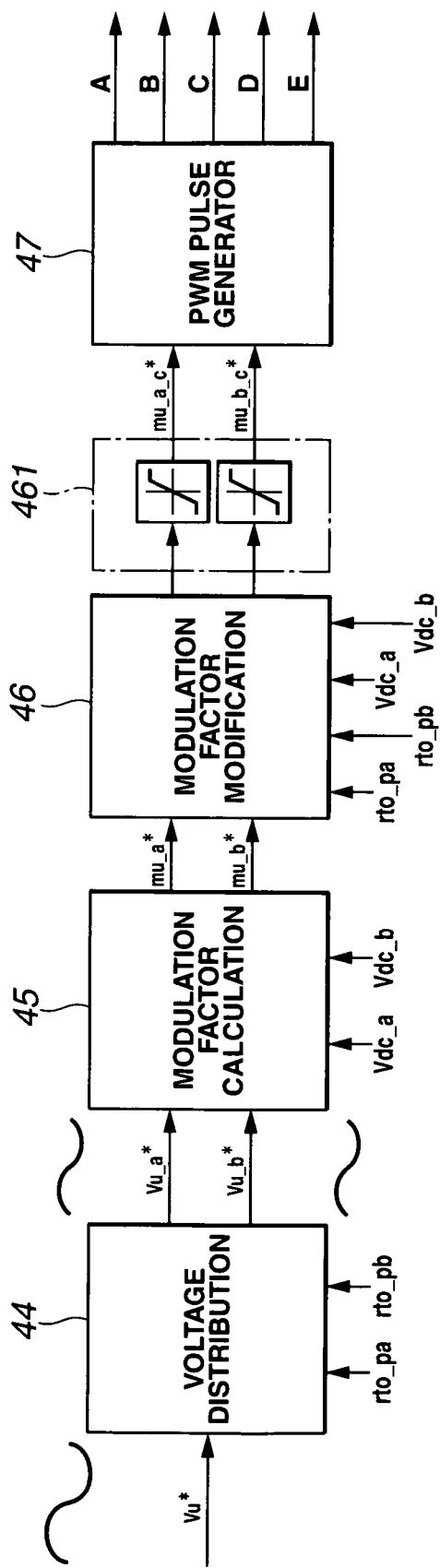
FIG. 29 is a block diagram showing a part of a control unit with a limiter according to an eleventh embodiment.
Figure 30:
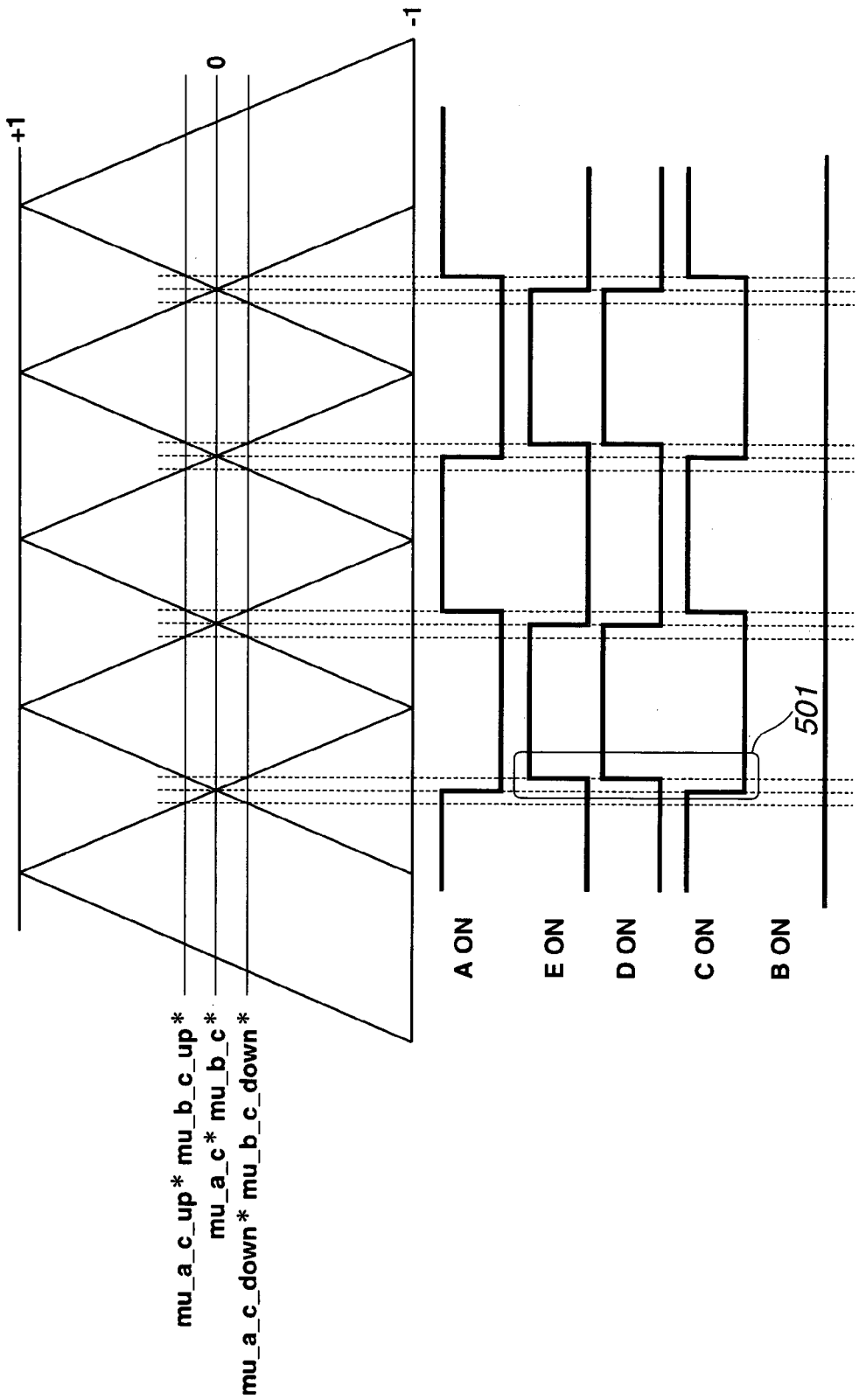
FIG. 30 is a view illustrating pulse signals produced in the system shown in FIG. 17A.
Figure 31:
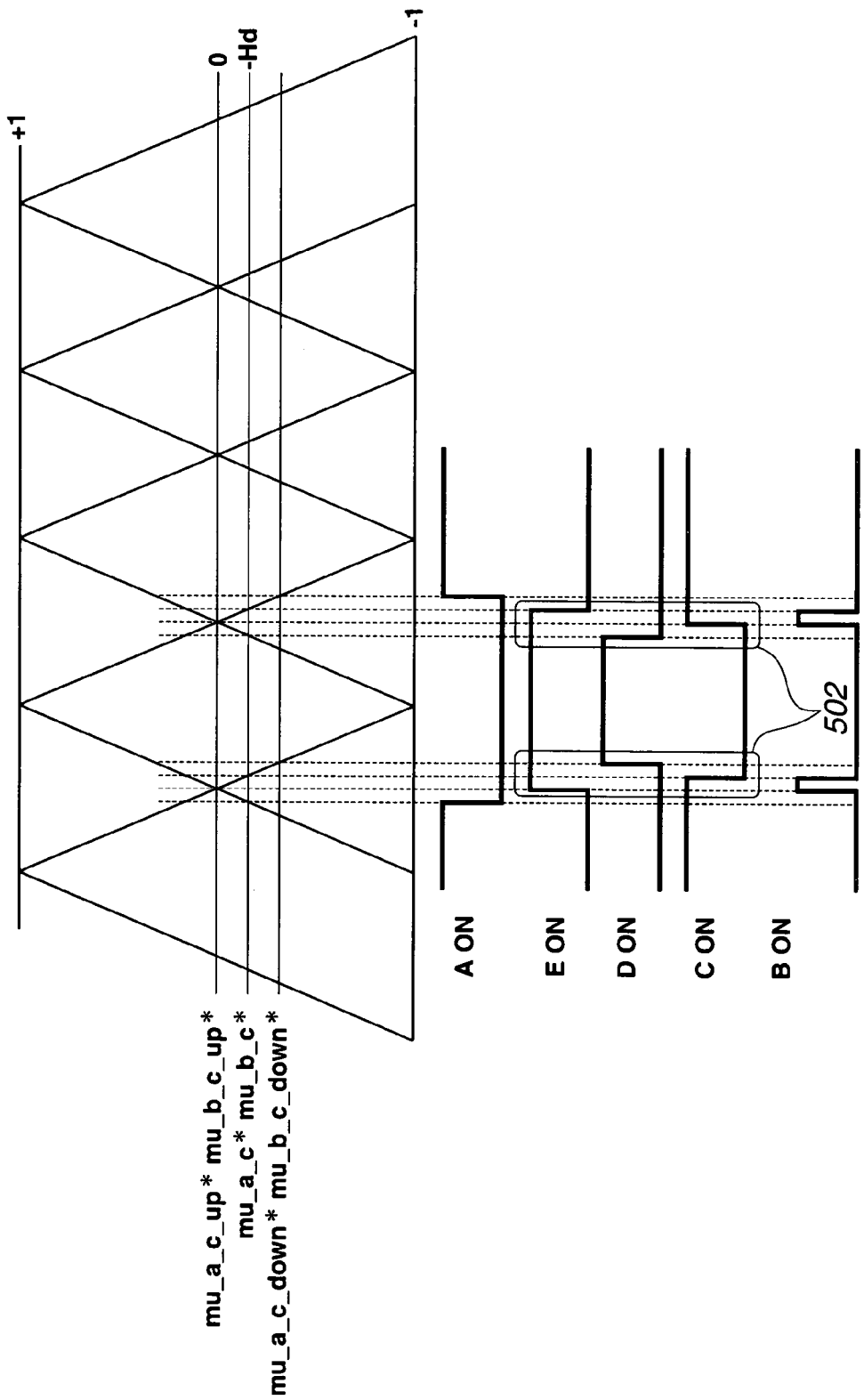
FIG. 31 is a view illustrating a method of generating pulse signals according to the eleventh embodiment.

FIGS. 29~31 are views for illustrating an eleventh embodiment of the present invention. The eleventh embodiment is similar to the seventh embodiment illustrated in FIGS. 20~23. The motor drive system according to the eleventh embodiment further includes a modulation factor limiter 461 as shown in FIG. 29. When the dead time is added to the drive signals and the command modulation factors mu_a_c* and mu_b_c* are both equal to zero, then the drive signals E and C are both OFF in an interval 501 as shown in FIG. 30. When both E and C are turned off while current is flowing from motor 20 toward the power source, a voltage is produced between terminals by the inductance of the motor and the derivative of the current. Therefore, when two or more semiconductors switches are turned off, it is necessary to take account of this voltage in setting the withstand voltage of a semiconductor switch.

The control unit according to the eleventh embodiment is arranged to always secure a path of current flowing from the motor toward the dc power source by on-off control of the semiconductor switches, thereby to restrain a voltage produced between terminals, and to reduce the cost of the semiconductor switches. As shown in FIG. 29, the modulation factor limiter 461 is connected between the modulation factor modifying section 46 and PWM pulse generating section 47. Modulation factor limiter 461 sets an upper limit on the modulation factor and limits the modulation factor to the upper limit. In this embodiment, the upper limit mu_a_c_ max is determined by the following equation.

$$mu\_a\_c\_max = 1 - 2 \frac{\left|\frac{rto\_pb}{Vdc\_b}\right|}{\left|\frac{rto\_pa}{Vdc\_a}\right| + \left|\frac{rto\_pb}{Vdc\_b}\right|} - Hd$$

Thus, the upper limit is determined by subtracting the value corresponding to the dead time, from the maximum possible value of the modulation factor determined by the offset value.

FIG. 31 shows the pulses produced when the command modulation factors shown in FIG. 30 are transmitted through the modulation factor limiter 461. By the limitation of the modulation factor to −Hd, the system can provide intervals 502 during which the drive signals E and C turn on both.

12th Embodiment

Figure 32:
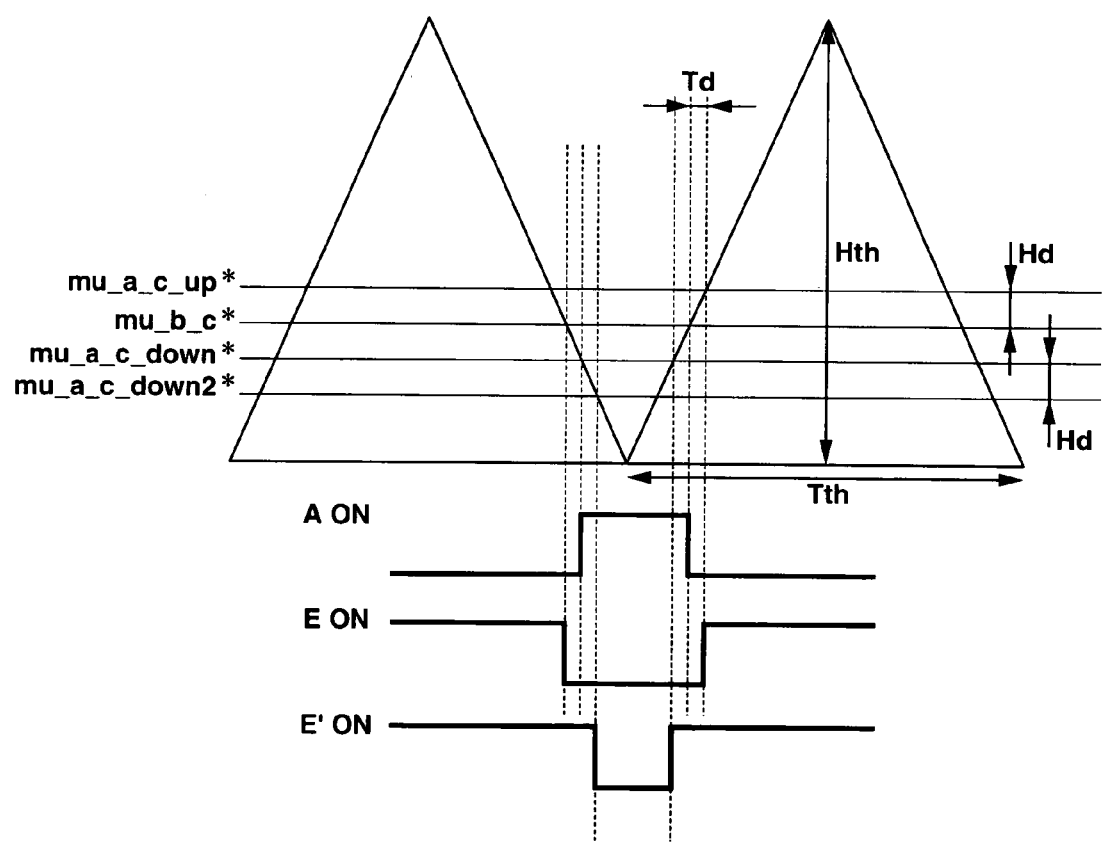
FIG. 32 is a view illustrating a method of generating pulse signals according to a twelfth embodiment.
Figure 33:
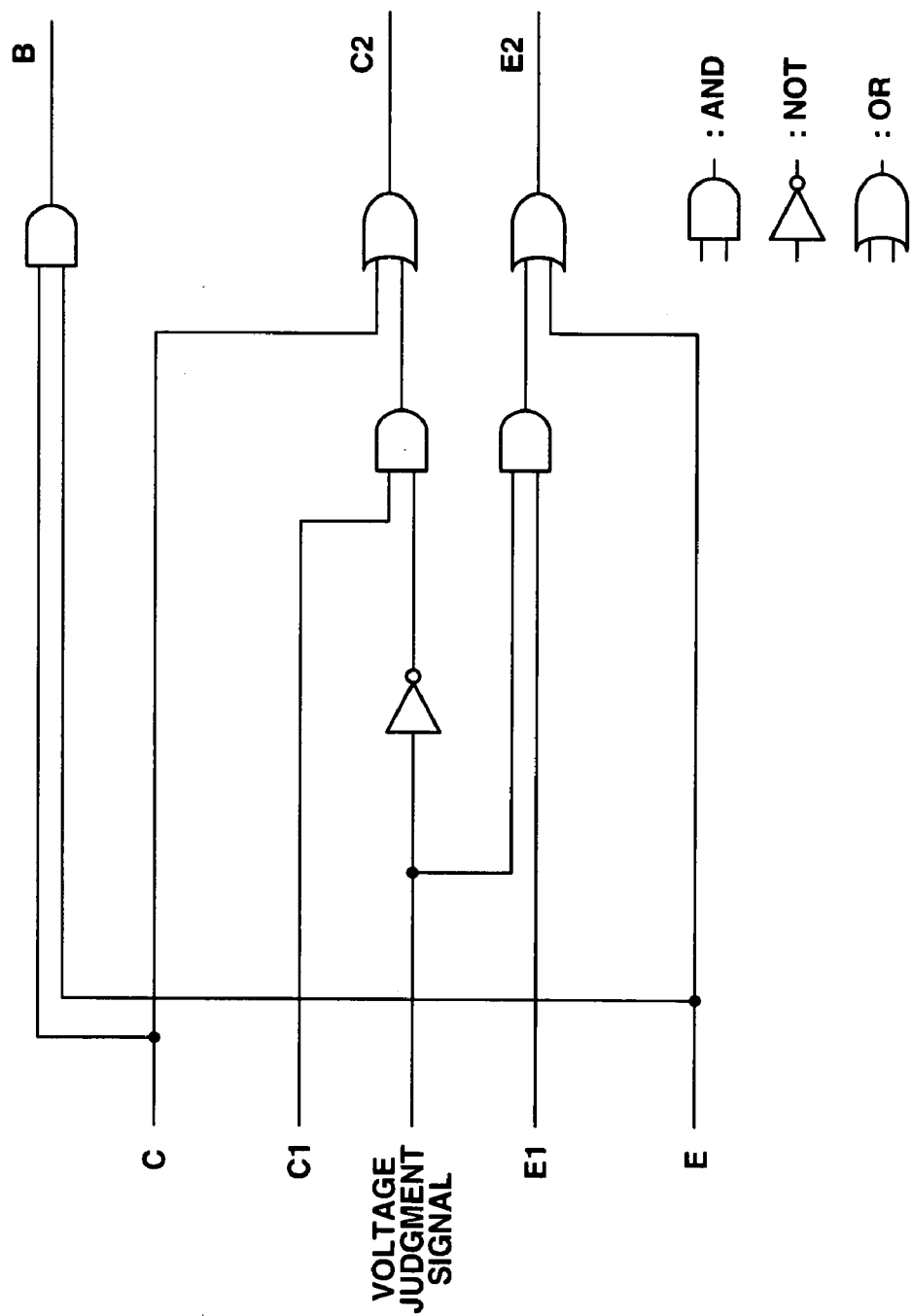
FIG. 33 is a diagram showing a circuit for selecting drive signals which can be employed in the twelfth embodiment.

FIGS. 32~33 are views for illustrating a twelfth embodiment. The control unit according to the twelfth embodiment is almost the same as the control unit of the eleventh embodiment. Especially, the modulation factor modifying section 46 and the preceding sections 44 and 45 are identical to those of the eleventh embodiment. The PWM pulse generating section 47 of the twelfth embodiment is configured to produce drive signals E1 and C1 in the following manner. When the switch drive signals for A and E are produced with the addition of the dead time, the drive signal E1 is produced for E so as to allow simultaneous turn-on with A. For producing E1, mu_a_c_down2* is determined in the following manner (pulse voltage generating means for allowing a short circuit between electrodes of the same polarity).

$$mu\_a\_c\_down2^* = mu\_a\_c^* - 2Hd$$

The drive signal E1 is produced, by the comparison between the carrier and mu_a_c_down2*, according to the following rule.

E1=OFF if mu_a_c_down2*≧carrier for source 10a
E1=ON if mu_a_c_down2*≦carrier for source 10a FIG. 32 shows the thus-produced drive signals A, E and E1. Similarly, the drive signal C1 is produced for C so as to allow simultaneous turn-on with D.

$$mu\_b\_c\_down2^* = mu\_b\_c^* - 2Hd$$

C1=OFF if mu_b_c_down2*≧carrier for source 10b
C1=ON if mu_b_c_down2*≦carrier for source 10b The thus-produced drive signals E1 and C1 could cause a short circuit between the positive electrodes of the power sources. However, depending on the voltages of the power sources, no short-circuit current flows even if one of the paths between the positive electrodes is short circuited.

When, for example, Vdc_a>Vdc_b, no short circuit current flows even if D and C turn on simultaneously because this path is blocked by the semiconductor switch. When Vdc_a<Vdc_b, no short-circuit current flows even if A and E turn on simultaneously. Moreover, when the potential difference between Vdc_a and Vdc_b is small, a great short-circuit current does not flow even if either of the path of A and E and the path of C and D is short-circuited. Based on this, the control system compares the voltages, and thereby selects the path for which a short circuit between the positive electrodes is allowed.

The control system senses the voltage Vdc_a of first power source 10a and the voltage Vdc_b of second power source 10b, and produces a voltage judgment signal which is H when Vdc_b>Vdc_a. In this case, the system employs a hysteresis with a threshold, and thereby prevent undesired chattering in the switches from being caused by change-over of the voltage judgment signal due to noises superposed on the signals of the voltage sensors. By using a hysteresis width Vhs used as the threshold, the control system produces the voltage judgment signal in the following manner.

The voltage judgment signal is changed from L to H if Vdc_b>Vdc_a+Vhs.

The voltage judgment signal is changed from H to L if Vdc_b<Vdc_a−Vhs.

The hysteresis width is determined by examining the magnitude of noises in the voltage signals.

A logic circuit shown in FIG. 33 receives, as inputs, the thus-produced voltage judgment signal (which is H when E side>C side) and the drive signals E, E1, C and C1 produced as mentioned above, and selects the drive signal allowing short circuit between the positive electrodes and the drive signal inhibiting the short circuit. When the voltage judgment signal is H, a new drive signal E2 is produced by the logical sum OR of E and E1, and this new drive signal E2 is outputted as the drive signal for E. In this case, E1 is produced longer than the on pulse of E, and hence E2 becomes equal to E1. As a result, the drive signal E1 is selected as the drive signal for E. C is outputted as C2. When the voltage judgment signal is L, E is selected and outputted as E2, and C1 is outputted as C2. The thus-produced drive signals E2 and C2 are substituted for E and C, and used for controlling the on/off conditions of the switches.

Figure 35:
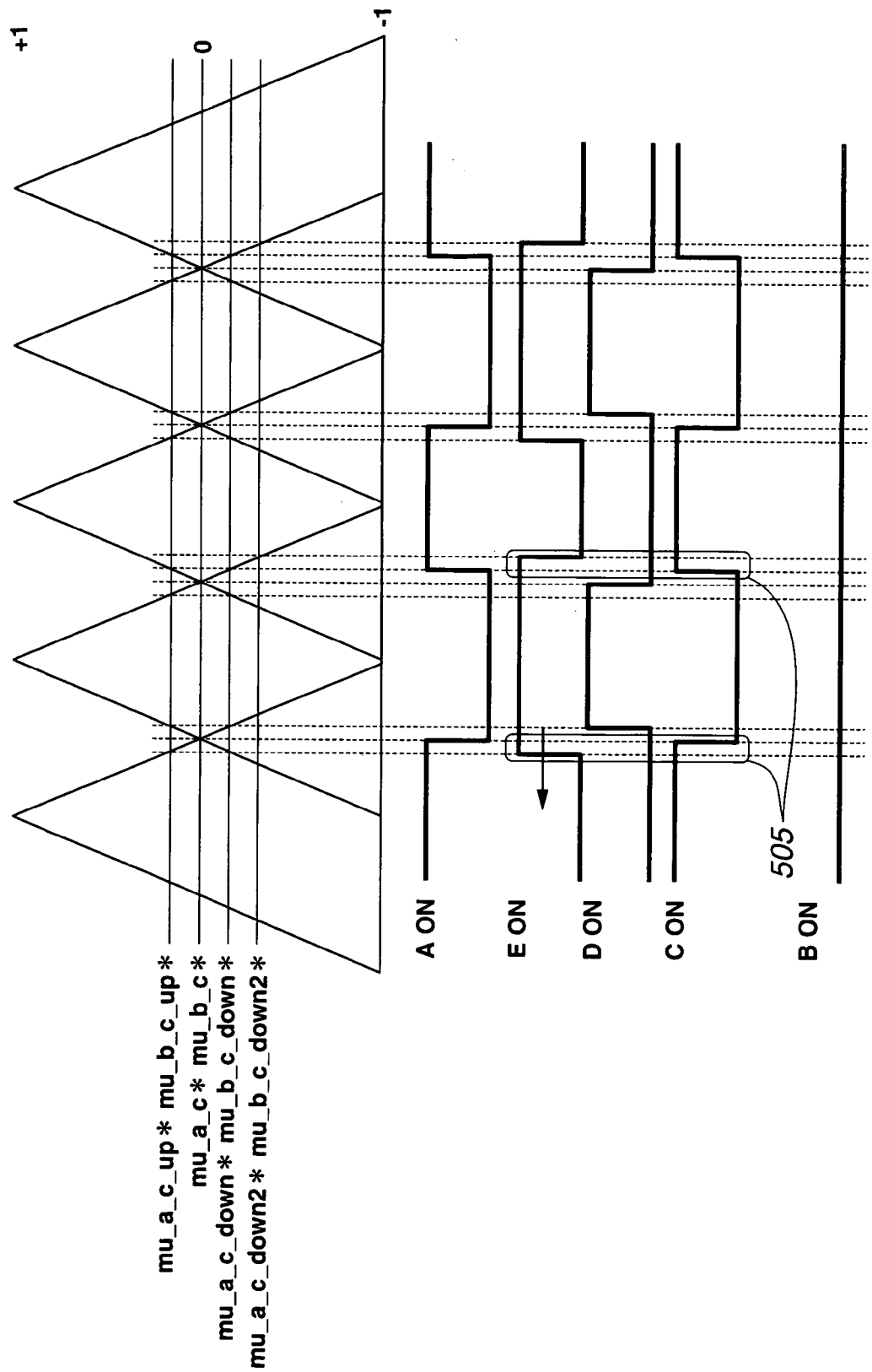
FIG. 35 is a view illustrating a process of generating pulse signals in the twelfth embodiment.

Thus, in dependence on the voltages, the system allows a short-circuit between the positive electrodes, and thereby secures a current path from the output terminal of the power converter to one of the positive electrodes. Thus, the control system of this embodiment secures the current path to the positive electrode with the on times of E and C, as shown at 505 in FIG. 35, when the voltage judgment signal is H, and mu_b_c*=mu_a_c*=0. Therefore, the control system of this embodiment can restrain the voltage produced across the switches and reduce the cost of the semiconductor switches, by always securing the current path from the motor toward the dc power source by the on/off control of the semiconductor switches.

13th Embodiment

Figure 34:
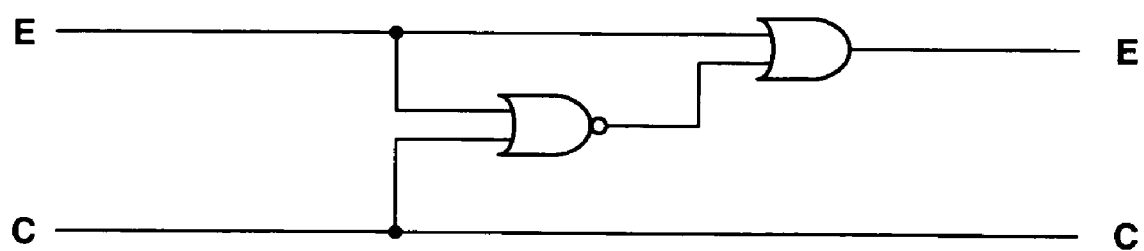
FIG. 34 is a diagram showing a circuit for selecting driving signals according to a thirteenth embodiment.

FIG. 34 is a view for illustrating a thirteenth embodiment of the present invention. As shown in FIG. 34, a logic circuit employed in this embodiment receives, as inputs, the drive signals E and C produced as in the eleventh embodiment, or the twelfth embodiment or by the arrangement of the eleventh embodiment which does not include the limiter 461. In accordance with the input signals E and C, the logic circuit of FIG. 34 produce renewed drive signals E and C to secure a current path from the motor toward the dc power source. When input drive signals E and C are both OFF (L), then the output of NOR is H. This output of the NOR circuit and the original signal E are inputted to an OR circuit, which outputs the renewed signal E at H level. In this way, the logic circuit of FIG. 34 can turn on the signal E when E and C are both OFF, and thereby secures a current path from the motor toward the source.

In the case in which the second power source 10b is a rechargeable secondary battery, and the first power source 10a is a non-chargeable power source such as a dc generator, the output signal E of the logic circuit of FIG. 34 continues to be ON if the input signals E and C continue to be OFF. In this case, power source 10b is charged by the induced voltage of the motor if the switch from the power source toward the motor continues to be OFF. When, on the other hand, the second power source 10b is not chargeable, and the above-mentioned switch states continue, only a smoothing capacitor is charged, and the voltage across this smoothing capacitor is increased, so that there arises a need for providing a means for protecting circuit components against this increase of the voltage. In this way, by selecting the signals with the logic circuit so as to secure a current path from the motor to a rechargeable power source, it is possible to provide a control system requiring no smoothing capacitor, preventing an undesired voltage increase, and enabling simplification of the system without the need for protecting means.

According to the illustrated embodiments of the present invention, the controller (40) is configured to produce the first PWM pulse signal by comparing a first desired modulation factor with a first periodic carrier signal (such as a triangular carrier or a sawtooth carrier); to produce the second PWM pulse signal by comparing a second desired modulation factor with a second periodic carrier signal (such as a triangular carrier or a sawtooth carrier); and to control a ratio between an amount of power (Pa) supplied from the first source terminal and an amount of power (Pb) supplied from the second source terminal, by varying the first desired modulation factor and the second desired modulation factor. In the first embodiment, for example, the section 42 and 43 can serve as first calculating means for calculating a command apply voltage (such as Vu*, Vv*, Vw*) representing a desired voltage to be applied to the motor. Section 44 can serve as second calculating means for calculating a plurality of command share voltages corresponding to supply voltages (Vdc_a, Vdc_b) of the multi-output dc power source, from the command apply voltage. Sections 45, 46 and 47 can serve as means for producing a pulsed voltage to drive the motor by driving the switching devices in accordance with the command share voltages. In the seventh, eighth, ninth and tenth embodiments, at least, a motor drive process includes at least a step of preventing a simultaneous turn-on of two of the switching devices paired in a first pair to prevent a short-circuit in a first current path between two of the source terminals, by interposing a temporary off state in which both of the two switching devices in the first pair are OFF, between a first switching state in which a first one of the switching devices of the first pair is OFF and a second one of the switching devices of the first pair is ON, and a second switching state in which the first one is ON and the second one is OFF.

This application is based on (1) a prior Japanese Patent Application No. 2004-316718 filed in Japan on Oct. 29, 2004; (2) a prior Japanese Patent Application No. 2004-354155 filed in Japan on Dec. 7, 2004; and (3) a prior Japanese Patent Application No. 2004-355547 filed in Japan on Dec. 8, 2004. The entire contents of these Japanese Patent Applications are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A motor drive system for driving a motor, comprising:
   a multi-output dc power source providing three or more output potentials;
   a switching circuit including switching devices connected, respectively, with the output potentials of the multi-output power source, and arranged to drive the motor with power of the power source; and
   a controller configured
   to determine a command apply voltage representing a desired voltage to be applied to the motor,
   to determine a plurality of command share voltages corresponding to supply voltages of the multi-output dc power source, from the command apply voltage, and
   to produce a pulsed voltage by driving the switching devices in accordance with the command share voltages.

2. The motor drive system as claimed in claim 1, wherein the controller comprises a pulse generating section to produce PWM pulse signals each corresponding to one of the output potentials of the power source.

3. The motor drive system as claimed in claim 2, wherein the multi-output dc power source includes a first source terminal to provide, as one of the output potentials, a first output potential, a second source terminal to provide, as one of the output potentials, a second output potential and a third source terminal to provide, as one of the output potentials, a common potential; and
   the pulse generating section of the controller is configured to produce a first PWM pulse signal for driving the switching device for one of the supply voltages in a first time interval within each PWM period and a second PWM pulse signal for driving the switching device for the other of the supply voltages in a second time interval within each PWM period.

4. The motor drive system as claimed in claim 3, wherein a ratio between the first time interval to produce the first PWM pulse signal and the second time interval to produce the second PWM pulse signal within each PWM period is constant.

5. The motor drive system as claimed in claim 3, wherein the controller comprises a voltage distribution section configured to determine the command share voltages corresponding to the supply voltages of the multi-output dc power source, from the command apply voltage in accordance with a voltage distribution command representing a desired amount of power to be supplied from the first source terminal for providing the first output potential and a desired amount of power to be supplied from the second source terminal for providing the second output potential; and
   the pulse generating section of the controller is configured to vary the first and second time intervals in accordance with the voltage distribution command.

6. The motor drive system as claimed in claim 5, wherein the pulse generating section determines the first time interval in proportion to the first desired amount of power to be supplied from the first source terminal, and the second time interval in proportion to the second desired amount of power to be supplied from the second source terminal.

7. The motor drive system as claimed in claim 5, wherein the pulse generating section of the controller is configured to vary the first and second time intervals within a range bounded between an upper limit and a lower limit.

8. The motor drive system as claimed in claim 3, wherein the pulse generating section of the controller is configured to produce two on pulses, as the first PWM pulse signal, respectively, in both end portions of one PWM period, and an on pulse, as the second PWM pulse signal, in a middle portion of one PWM period between the two on pulses of the first PWM pulse.

9. The motor drive system as claimed in claim 8, wherein the pulse generating section of the controller is configured to produce the first PWM pulse signal and the second PWM pulse signal, respectively, by using first and second carriers which are inverted in phase.

10. The motor drive system as claimed in claim 9, wherein the pulse generating section of the controller is configured to convert the first command share voltage into a first command modulation factor by normalization with the first supply voltage, and by modification with the voltage distribution command, and to convert the second command share voltage into a second command modulation factor by normalization with the second supply voltage, and by modification with the voltage distribution command; and the pulse generating section is configured to produce the first PWM pulse by comparing the first carrier with the first command modulation factor and to produce the second PWM pulse by comparing the second carrier with the second command modulation factor.

11. The motor drive system as claimed in the claim 10 wherein the pulse generating section is configured to determine the first command modulation factor by modifying, with the first desired amount of power to be supplied from the first source terminal, an instantaneous target modulation factor calculated by the normalization of the first command share voltage with the first supply voltage, and to determine the second command modulation factor by modifying, with the second desired amount of power to be supplied from the second source terminal, an instantaneous target modulation factor calculated by the normalization of the second command share voltage with the second supply voltage.

12. The motor drive system as claimed in the claim 11 wherein the pulse generating section is configured to determine the first and second command modulation factors by addition of an offset quantity determined in accordance with the first and second supply voltages, and the first and second desired amounts of power.

13. The motor drive system as claimed in claim 3, wherein the pulse generating section of the controller is configured to produce a first on pulse, as the first PWM pulse signal, in a first end portion of one PWM period, and a second on pulse, as the second PWM pulse signal, in a second end portion of one PWM period so that the first on pulse in one PWM period is adjacent to the second on pulse in an adjacent PWM period.

14. The motor drive system as claimed in claim 13, wherein the pulse generating section of the controller is configured to produce the first PWM pulse signal and the second PWM pulse signal, respectively, by using first and second sawtooth carriers which are symmetrical with each other and an apex of the first sawtooth carrier is coincident with an apex of the second sawtooth carrier.

15. The motor drive system as claimed in claim 3, wherein the pulse generating section of the controller is configured to hold two of the switching devices OFF for a predetermined time to prevent a short-circuit between two of the source terminals, and to turn one of the two of the switching devices from OFF to ON after the elapse of the predetermined time.

16. The motor drive system as claimed in claim 3, wherein the pulse generating section of the controller is configured to prevent a simultaneous turn-on of two of the switching devices paired in a first pair to prevent a short-circuit in a first current path between two of the source terminals, by interposing a temporary off state in which both of the two switching devices in the first pair are OFF, between a first switching state in which a first one of the switching devices of the first pair is OFF and a second one of the switching devices of the first pair is ON, and a second switching state in which the first one is ON and the second one is OFF.

17. The motor drive system as claimed in claim 16, wherein the pulse generating section of the controller is configured to prevent a simultaneous turn-on of two of the switching devices paired in a second pair to prevent a short-circuit in a second current path between two of the source terminals, by controlling at least one of the switching devices of the second pair in accordance with a switching operation of at least one of the switching devices of the first pair.

18. The motor drive system as claimed in claim 16, wherein the pulse generating section of the controller is configured to determine a selected path selected from a plurality of inter-terminal paths between two of the source terminals of the multi-output dc power source, and to prevent a simultaneous turn-on of two of the switching devices paired in the selected path to prevent a short-circuit in the selected path, by interposing the temporary off state between the first switching state and the second switching state.

19. The motor drive system as claimed in claim 18, wherein the pulse generating section of the controller is configured to determine a potential difference between two of the source terminals and to select one of the inter-terminal paths as the selected path in accordance with the potential difference.

20. The motor drive system as claimed in claim 19, wherein the pulse generating section of the controller is configured to perform a hysteresis control to determine the potential difference.

21. The motor drive system as claimed in claim 19, wherein the pulse generating section of the controller is configured to select one of the inter-terminal paths for prevention of a short-circuit in accordance with a sign of the potential difference.

22. The motor drive system as claimed in claim 3, wherein the pulse generating section of the controller is configured to monitor the drive signals to the switching devices to detect an all-off state in which all the switching devices are to be turned off, and to turn on at least one of the switching devices so as to secure a current path from the motor to the multi-output dc power source when the all-off state is detected.

23. The motor drive system as claimed in claim 3, wherein the pulse generating section is configured to limit the command share voltages, and thereby to secure a current path from the motor to the multi-output dc power source.

24. The motor drive system as claimed in claim 3, wherein the pulse generating section is configured to calculates a plurality of command modulation factors, respectively, from the command share voltages, to limit the command modulation factors to secure a current path form the motor to the multi-output dc power source, and to produce the PWM pulse signals, respectively, in accordance with the command modulation factors.

25. The motor drive system as claimed in claim 3, wherein the pulse generating section is configured to produce a short-circuit preventing switch drive signal to prevent a short-circuit in an inter-terminal path between two of the source terminals, and a short-circuit allowing switch drive signal to allow a short-circuit in the inter-terminal path; and to secure a current path from the motor to the multi-output dc power source by outputting one selected between the short-circuit preventing switch drive signal and the short-circuit allowing switch drive signal.

26. The motor drive system as claimed in claim 25, wherein the pulse generating section of the controller is configured to monitor the drive signals to the switch devices to detect an all-off state in which all the switch devices are to be turned off, and to turn on at least one of the switch devices so as to form a current path from the motor to the multi-output dc power source when the all off state is detected.

27. The motor drive system as claimed in claim 25, wherein the pulse generating section is configured to compare the supply voltages with each other, and to select one between the short-circuit preventing switch drive signal and the short-circuit allowing switch drive signal, in accordance with the result of the comparison between the supply voltages.

28. The motor drive system as claimed in claim 25, wherein the pulse generating section is configured to select a current path so as to prevent excessive current flow when the short-circuit allowing switch drive signal is selected.

29. The motor drive system as claimed in claim 27, wherein the pulse generating section is configured to compare the supply voltages with each other with a threshold to provide a hysteresis.

30. A motor drive process for driving a motor with power of a multi-output dc power source providing three or more output potentials, the motor drive process comprises:
  calculating a command apply voltage representing a desired voltage to be applied to the motor;
  calculating a plurality of command share voltages corresponding to at least two of the output potentials of the multi-output dc power source, from the command apply voltage; and
  producing a pulsed voltage to drive the motor by connecting one of the output potentials to the motor in accordance with the command share voltages.

31. A motor drive system comprising:
  an ac motor;
  a multi-output dc power source including first, second and source terminals providing three output potentials;
  a switching circuit including first, second and third switching devices which are connected, respectively, with the first, second and third source terminals, and which are driven, respectively, by first, second and third PWM pulse signals to connect one of the source terminals with the motor to drive the motor with power of the multi-output dc power source; and
  a controller configured
  to produce the first PWM pulse signal by comparing a first desired modulation factor with a first periodic carrier signal,
  to produce the second PWM pulse signal by comparing a second desired modulation factor with a second periodic carrier signal, and to control a ratio between an amount of power supplied from the first source terminal and an amount of power supplied from the second source terminal, by varying the first desired modulation factor and the second desired modulation factor.

32. The motor drive system as claimed in claim 31, wherein the first and second periodic carrier signals alternate between an upper limit and a lower limit periodically so that a point at which the first periodic carrier signal reaches the upper limit is coincident with a point at which the second periodic carrier signal reaches the lower limit; wherein the controller is configured to determine the first and second desired modulation factors in accordance with the first output potential and the second output potential; and wherein the controller is configured to produce the third PWM pulse signal from the first and second PWM pulse signals.

33. The motor drive system as claimed in claim 31, wherein the controller is configured to calculate a command apply voltage representing a desired voltage to be applied to the motor to achieve a desired motor output torque, to calculate a first command share voltage by multiplying the command apply voltage by a first power supply distribution ratio and a second command share voltage by multiplying the command apply voltage by a second power supply distribution ratio, to calculate a first command modulation factor in accordance with the first command share voltage and the first output potential, and a second command modulation factor in accordance with the second command share voltage and the second output potential, and to calculate the first desired modulation factor by subtraction of a first subtrahend from the first command modulation factor, and the second desired modulation factor by subtraction of a second subtrahend from the second command modulation factor.

34. The motor drive system as claimed in claim 33, wherein the first and second subtrahends are constant.

35. The motor drive system as claimed in claim 33, wherein the controller is configured to calculate the first and second subtrahends in accordance with the first and second power supply distribution ratios.

36. A motor drive system for driving a motor with power of a multi-output dc power source providing three or more output potentials, the motor drive system comprises:

switching devices connected, respectively, with the output potentials of the multi-output power source, and arranged to drive the motor with power of the power source;

first calculating means for calculating a command apply voltage representing a desired voltage to be applied to the motor;

second calculating means for calculating a plurality of command share voltages corresponding to supply voltages of the multi-output dc power source, from the command apply voltage; and means for producing a pulsed voltage to drive the motor by driving the switching devices in accordance with the command share voltages.

* * * * *